(12) United States Patent
Brockman, IV et al.

(10) Patent No.: US 11,341,448 B2
(45) Date of Patent: May 24, 2022

(54) SYSTEMS AND METHODS FOR COSMETICS PRODUCTS RETAIL DISPLAYS

(71) Applicant: Meiyume Holdings (BVI) Limited, Tortola (VG)

(72) Inventors: Robert Brockman, IV, Hong Kong (CN); Steve Dodd, Hong Kong (CN); Graham Atherton, Bootle (GB)

(73) Assignee: Meiyume Holdings (BVI) Limited, Road Town Tortola (VG)

( * ) Notice: Subject to any disclaimer, the term of this patent is extended or adjusted under 35 U.S.C. 154(b) by 107 days.

(21) Appl. No.: 16/556,033

(22) Filed: Aug. 29, 2019

(65) Prior Publication Data

US 2021/0065080 A1    Mar. 4, 2021

(51) Int. Cl.
    *G06Q 10/06* (2012.01)
    *A47F 7/00* (2006.01)
    *G06Q 10/04* (2012.01)

(52) U.S. Cl.
    CPC ....... *G06Q 10/0637* (2013.01); *A47F 7/0021* (2013.01); *G06Q 10/043* (2013.01)

(58) Field of Classification Search
    None
    See application file for complete search history.

(56) References Cited

U.S. PATENT DOCUMENTS

| 5,706,977 A | 1/1998 | Ogura et al. |
| 8,315,913 B2 | 11/2012 | Wolinsky et al. |
| 8,739,984 B2 * | 6/2014 | Hardy ............... A47F 7/0007 211/119.003 |
| 10,289,990 B2 * | 5/2019 | Rizzolo ............. G06Q 20/201 |
| 10,405,674 B2 * | 9/2019 | Mercier ............ G06Q 90/00 |

(Continued)

FOREIGN PATENT DOCUMENTS

| DE | 20 2013 103 874 U1 | 12/2013 |
| GB | 2 439 964 A | 1/2008 |

OTHER PUBLICATIONS

Hubner et al., "Effect of replenishment and backroom on retail shelf-space planning", Business Research (2017) 10:123-156 (Year: 2017).*

(Continued)

*Primary Examiner* — Thomas L Mansfield
(74) *Attorney, Agent, or Firm* — Seed IP Law Group LLP

(57) ABSTRACT

Technological advancements are disclosed that increase automation and efficiency in the operations of the computer networks, graphical user interfaces and databases for cosmetics retail displays to be responsive to retail store and customer requirements and increase performance of such systems. The system integrates information from various, often disparate and remotely located systems and databases, involved in the designing, manufacturing, producing, allocating and/or delivering components of cosmetics products retail displays to a diverse set of retail store locations. Customizations of cosmetics retail displays at various retail store locations are automated and facilitated based on cosmetics products retail sales performance at the various retail store locations. Users of such a system are provided information to more efficiently provide cosmetics retail displays and components, and supply updates to such displays according to current market data, sales, inventory and brand or manufacturer requirements.

21 Claims, 12 Drawing Sheets

(56) References Cited

U.S. PATENT DOCUMENTS

| | | | |
|---|---|---|---|
| 2005/0021561 A1 | 1/2005 | Noonan | |
| 2008/0255894 A1 | 10/2008 | Falls et al. | |
| 2008/0306787 A1* | 12/2008 | Hamilton | G06Q 10/0639 |
| | | | 705/7.38 |
| 2010/0155348 A1 | 6/2010 | Berry et al. | |
| 2010/0171826 A1* | 7/2010 | Hamilton | G06Q 30/06 |
| | | | 348/135 |
| 2012/0303154 A1* | 11/2012 | Stiernagle | G06Q 20/18 |
| | | | 700/214 |
| 2014/0019300 A1* | 1/2014 | Sinclair | G06Q 30/0246 |
| | | | 705/26.9 |
| 2014/0100769 A1* | 4/2014 | Wurman | G06Q 10/087 |
| | | | 701/301 |
| 2019/0026693 A1* | 1/2019 | Kawai | G06Q 10/0835 |

OTHER PUBLICATIONS

Patel, Kirit. "Pharmacy design, merchandising and stock control." Pharmacy Business Management (2005): 269. (Year: 2005).*
Guidi, Gabriele, et al. "Virtual reality for retail." 2010 16th International Conference on Virtual Systems and Multimedia. IEEE, 2010. (Year: 2010).*
Frontoni, Emanuele, Adriano Mancini, and Primo Zingaretti. "Embedded Vision Sensor Network for Planogram Maintenance in Retail Environments." Sensors 15.9 (2015): 21114-21133. (Year: 2015).
Non-final Office Action for U.S. Appl. No. 17/005,336, dated Nov. 12, 2021, 16 pages.
U.S. Appl. No. 17/005,336, filed Aug. 28, 2020.

* cited by examiner

SYSTEMS AND METHODS FOR COSMETICS PRODUCTS RETAIL DISPLAYS

FIELD

This disclosure generally relates to cosmetics products retail displays, and particularly to improvements in operations of computer networks, graphical user interfaces and databases for cosmetics products retail displays.

BRIEF SUMMARY

Cosmetics retails displays include shelving, drawers, signage, artwork, fixtures, panels, frames, end caps, consultation stations, lighting and other various components to display cosmetics products to retail customers at retail stores selling such cosmetics products. Cosmetics products include a wide range and variety of products and are often provided in small containers of various shapes and sizes, which results in retail cosmetics displays that are densely populated with large numbers of different sizes and varieties of cosmetics products. For example, there may often be over 2,500 individual cosmetics products for a 50 foot wall display area in a retail store. The environment of each retail store location for displaying such products is very diverse and varies significantly within and between each retail store in size, dimension and marketing requirements.

Thus, the large numbers of different sizes and varieties of cosmetics products at each retail store location, and the diverse environments in which such products will be displayed, result in a complex process for updating and changing such displays to address current market conditions that takes many factors into consideration and depends on the input, products and information from various different entities and systems, including suppliers, retailers, clients, project managers, account managers, designers or developers, and finance systems. The present disclosure includes technological advancements, including an enterprise software platform that centralizes knowledge and empowers its users to share information, that increase automation and efficiency in the operations of the computer networks, graphical user interfaces and databases for cosmetics retail displays to be responsive to retail store and customer requirements and increase performance of such systems.

A method for electronically managing display components for cosmetics products may be summarized as including receiving, by at least one computer processor, data representing at least one planogram for a plurality of cosmetics products for each of a plurality of retail store locations; receiving, by at least one computer processor, data regarding a plurality of display components for the plurality cosmetics products, the data regarding the plurality of display components for the cosmetics products including data identifying the plurality of display components for the cosmetics products and current different retail store locations of the plurality of display components for the cosmetics products; determining, by at least one computer processor, based on the data representing at least one planogram for a plurality of cosmetics products and the data regarding the plurality of display components for the cosmetics products, whether there are sufficient display components for the plurality of cosmetics products located at each of the plurality of retail store locations to implement the at least one planogram for the plurality of cosmetics products for each of the plurality of retail store locations; and initiating, by at least one computer processor, services to supply one or more display components for the plurality of cosmetics products to one or more of the plurality of retail store locations based on the determination whether there are sufficient display components for the plurality of cosmetics products located at each of the plurality of retail store locations to implement the at least one planogram for the plurality of cosmetics products for each of the plurality of retail store locations. The determining whether there are sufficient display components for the plurality of cosmetics products located at each of the plurality of retail store locations to implement the at least one planogram may include for each retail store location of the plurality of retail store locations comparing, by at least one computer processor, data representing a planogram for cosmetics products to be displayed at the retail store location with a current inventory of display components at the retail store location; and determining whether there are sufficient display components currently located the retail store location to implement the planogram for cosmetics products to be displayed at the retail store location based on the comparison of data representing the planogram for cosmetics products to be displayed at the retail store location with the current inventory of display components at the retail store location.

The method may further include for at least one retail store location of the plurality of retail store locations receiving, by at least one computer processor, sales data of cosmetics products that were displayed at the at least one retail store location according to a current planogram of the at least one retail store location; revising the current planogram of the at least one retail store location to generate a revised planogram; and initiating, by at least one computer processor, services to supply one or more display components for the plurality of cosmetics products to the at least one retail store location for implementing revised planogram.

The method may further include for the at least one retail store location of the plurality of retail store locations, determining, by at least one computer processor, a revision to the current planogram of the at least one retail store location based on the sales data of cosmetics products that were displayed at the at least one retail store location according to the current planogram of the at least one retail store location, wherein the revising the current planogram of the at least one retail store location to generate the revised planogram is performed by the at least one computer processor and is based on the determination by the at least one computer processor of the revision to the current planogram. The determining the revision to the current planogram of the at least one retail store location based on the sales data may include determining, by at least one computer processor, a correlation between cosmetics products that are placed in proximity to each other according to the current planogram and sales performance of the cosmetics products that are placed in proximity to each other according to the current planogram; and determining the revision to the current planogram of the at least one retail store location based on the determined correlation between the cosmetics products that are placed in proximity to each other according to the current planogram and the sales performance of the cosmetics products that are placed in proximity to each other according to the current planogram.

The method may further include repeating the receiving sales data, the revising the current planogram and the initiating services to supply one or more display components for each retail store location of the plurality of retail store locations.

The method may further include determining, by at least one computer processor, that there are not sufficient display components at a particular retail store location of the plurality of retail store locations to implement the at least one planogram for the plurality of cosmetics products at the particular retail store location; determining, by at least one computer processor, that there exist at least some spare display components at one or more other retail store locations of the plurality of retail store locations that may be used to implement the at least one planogram for the plurality of cosmetics products at the particular retail store location; and initiating, by at least one computer processor, services to supply the at least some spare display components at the one or more other retail store locations of the plurality of retail store locations to the particular retail store location based on the determination that that there exist at least some spare display components at the one or more other retail store locations of the plurality of retail store locations that may be used to implement the at least one planogram for the plurality of cosmetics products at the particular retail store location.

The method may further include sending, by at least one computer processor, information regarding the at least one planogram and the one or more display components for printing or artwork services that are needed associated with the at least one planogram and the one or more display components for the plurality of cosmetics products based on a determination there are additional display components needed for the plurality of cosmetics products located at each of the plurality of retail store locations to implement the at least one planogram for the plurality of cosmetics products for each of the plurality of retail store locations; receiving, by at least one computer processor, estimates for printing or artwork services that are needed associated with the at least one planogram and the one or more display components in response to the sending of the information regarding the at least one planogram and the one or more display components for printing or artwork services that are needed; and initiating printing or artwork services that are needed associated with the at least one planogram and the one or more display components in response to the receiving the estimates for printing or artwork services that are needed associated with the at least one planogram and the one or more display components.

The method may further include receiving, by at least one computer processor, a revision to the at least one planogram for a plurality of cosmetics products for each of a plurality of retail store locations; determining, by at least one computer processor, based on the data representing at least one planogram for a plurality of cosmetics products and the data regarding the plurality of display components for the cosmetics products, whether there are sufficient display components for the plurality of cosmetics products located at each of the plurality of retail store locations to implement the revision to the at least one planogram for a plurality of cosmetics products for each of a plurality of retail store locations; and initiating, by at least one computer processor, services to supply one or more display components for the plurality of cosmetics products to one or more of the plurality of retail store locations based on the determination whether there are sufficient display components for the plurality of cosmetics products located at each of the plurality of retail store locations to implement the revision to the at least one planogram. The display components may be one or more of stands, displays, shelves and racks for display of cosmetics products at one or more retail store locations of the plurality of retail store locations.

The method may further include communicating, by at least one computer processor, with supplier systems for the plurality cosmetics products and for display components for the plurality cosmetics products; retailer systems for the plurality cosmetics products and for display components for the plurality cosmetics products; client systems for the plurality cosmetics products and for display components for the plurality cosmetics products; project manager systems for the plurality cosmetics products and for display components for the plurality cosmetics products; account manager systems for the plurality cosmetics products and for display components for the plurality cosmetics products; design or development systems for the plurality cosmetics products and for display components for the plurality cosmetics products; and finance systems for the plurality cosmetics products and for display components for the plurality cosmetics products, to facilitate providing services to supply one or more display components for the plurality of cosmetics products to one or more of the plurality of retail store locations.

The method may further include for each retail store location of the plurality of retail store locations determining, by at least one computer processor, a revision to a current planogram of the retail store location based on information received from a plurality of the supplier systems, the retailer systems, the client systems, the project manager systems, the account manager systems, the design or development systems, and the finance systems; and revising, by at least one computer processor, the current planogram of the retail store location to generate the revised planogram based on the determination by the at least one computer processor of the revision to the current planogram.

The method may further include for each retail store location of the plurality of retail store locations determining, by at least one computer processor, based on the revised planogram for the retail store location, whether there are sufficient display components located at the retail store location to implement the revised planogram; and initiating, by at least one computer processor, services to supply one or more display components for the plurality of cosmetics products to the retail store location based on the determination whether there are sufficient display components located at the retail store location to implement the revised planogram. The initiating services to supply one or more display components for the plurality of cosmetics products to one or more of the plurality of retail store locations may include initiating delivery of one or more display components for the plurality of cosmetics products to one or more of the plurality of retail store locations. The initiating services to supply one or more display components for the plurality of cosmetics products to one or more of the plurality of retail store locations may include initiating one or more of printing, artwork and production services for producing one or more display components for the plurality of cosmetics products.

A system for managing display components for cosmetics products may be summarized as including at least one processor; and at least one memory coupled to the at least one processor, the at least one memory having instructions thereon that, when executed by the at least one processor, cause the system for managing display components for cosmetics products to receive data from a supplier system for display components for cosmetics products, a retailer system of display components for cosmetics products, a client system for display components for cosmetics products, a project manager system for display components for cosmetics products, an account manager system for display components for cosmetics products, a designer or developer system for display components for cosmetics products, and a finance system for display components for cosmetics products; and determine, based on the received data from one or more of the supplier system for display components for cosmetics products, the retailer system of display components for cosmetics products, the client system for display components for cosmetics products, the project manager system for display components for cosmetics products, the account manager system for display components for cosmetics products, the designer or developer system for display components for cosmetics products, and the finance system for display components for cosmetics products, whether to initiate services to supply one or more display components for a plurality of cosmetics products to one or more of a plurality of retail store locations. The determining whether to initiate services to supply one or more display components for the plurality of cosmetics products to one or more of the plurality of retail store locations may include one or more of determining whether to initiate delivery of one or more display components for the plurality of cosmetics products to one or more of the plurality of retail store locations and determining whether to initiate printing, artwork or production services for producing one or more display components for the plurality of cosmetics products.

The instructions, when executed by the at least one processor, may further cause the system for managing display components for cosmetics products to initiate services to supply one or more display components for the plurality of cosmetics products to one or more of the plurality of retail store locations by initiating one or more of delivery of one or more display components for the plurality of cosmetics products to one or more of the plurality of retail store locations and initiating printing, artwork or production services for producing one or more display components for the plurality of cosmetics products.

A non-transitory computer-readable storage medium having computer-executable instructions stored thereon that, when executed, may be summarized as causing at least one processor to receive sales data of cosmetics products that were displayed by at least one retail store location of a plurality of retail store locations according to a current planogram of the at least one retail store location; revise the current planogram of the at least one retail store location to generate a revised planogram; and initiate services to supply one or more display components for the plurality of cosmetics products to the at least one retail store location for implementing revised planogram.

The instructions, when executed by the at least one processor, may further cause the at least one processor to for the at least one retail store location, determine a revision to the current planogram of the at least one retail store location based on the sales data of cosmetics products that were displayed by the at least one retail store location according to the current planogram of the at least one retail store location, wherein the revising the current planogram of the at least one retail store location to generate the revised planogram is based on the determination by the at least one computer processor of the revision to the current planogram. The determining the revision to the current planogram of the at least one retail store location based on the sales data may include determining a correlation between cosmetics products that are placed in proximity to each other according to the current planogram and sales performance of the cosmetics products that are placed in proximity to each other according to the current planogram; and determining the revision to the current planogram of the at least one retail store location based on the determined correlation between the cosmetics products that are placed in proximity to each other according to the current planogram and the sales performance of the cosmetics products that are placed in proximity to each other according to the current planogram.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
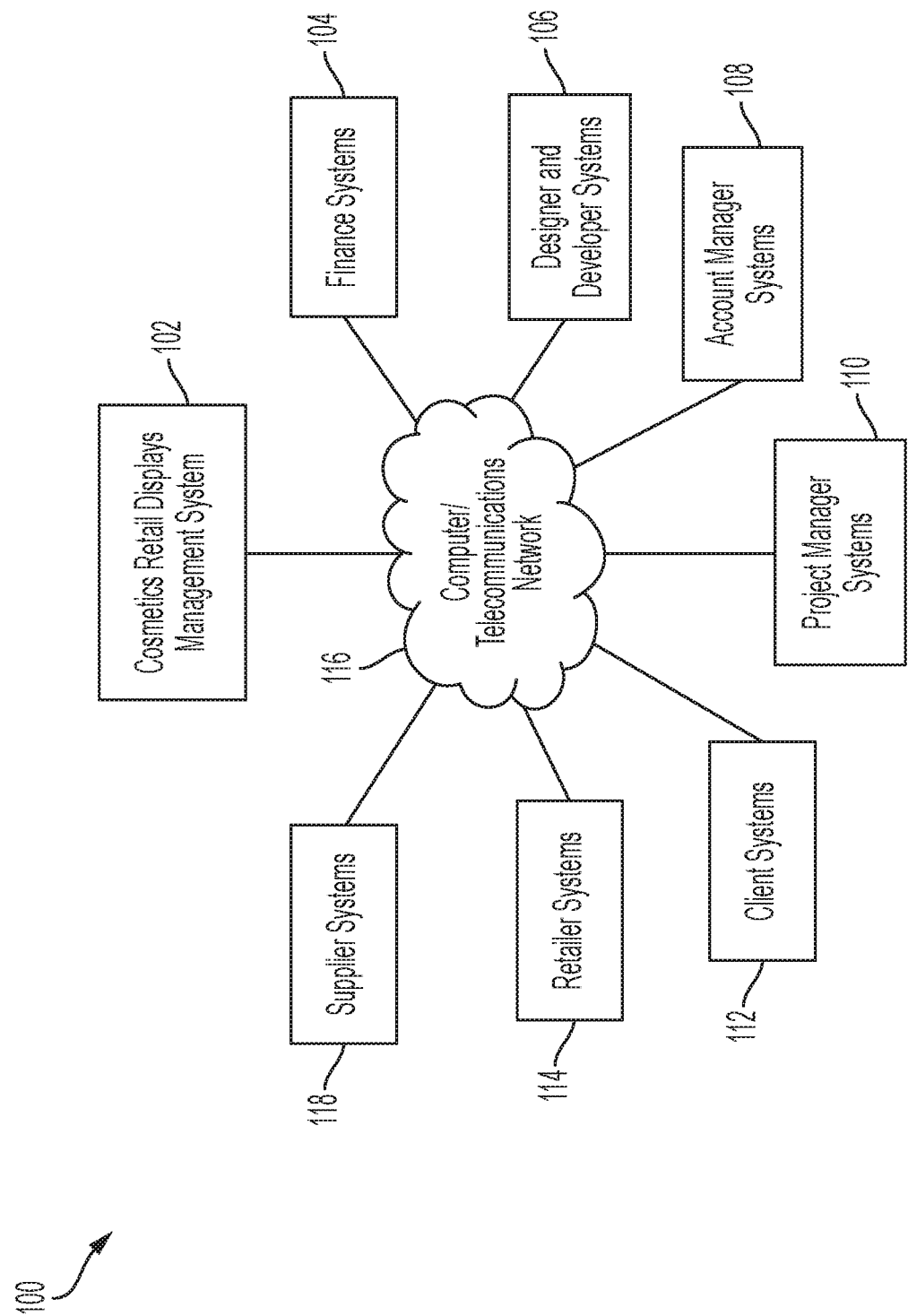
FIG. 1 is a system diagram of a processor-based networked environment, in which systems, devices and methods for improved operations of computer networks, graphical user interfaces and databases for cosmetics retail displays may be a part, or in which they may be implemented, according to various aspects of the present disclosure.

FIG. 1 is a system diagram of a processor-based networked environment 100, in which systems, devices and methods for improved operations of computer networks, graphical user interfaces and databases for cosmetics products retail displays may be a part, or in which they may be implemented, according to various aspects of the present disclosure. The present example is provided in the context of products in the cosmetics industry, but the systems, methods and devices disclosed herein may be ingeniously applicable to retail displays for other types of products in view of the present disclosure.

The large numbers of different sizes and varieties of cosmetics products at retail store locations and the diverse environments in which such products will be displayed result in a complex process for updating and changing such displays to address current market conditions that may take many factors into consideration and may depend on the input, products and information from various different entities and systems, including supplier systems 118, retailer systems 114, client systems 112, project manager systems 110, account manager systems 108, designer and developer systems 106, and finance systems 104. For example, cosmetics products may be displayed at the retail store according to a planogram. The planogram may define the location, arrangement and quantity of cosmetics products to be placed on display. Manufacturers, vendors and/or supply chain managers may send planograms to retailers ahead of new product shipments. This is useful when a vendor wants retail displays in multiple store locations to have the same look and feel. Often, a cosmetics manufacturer releases a planogram with each new product to show how the product can relate to existing products. However, cosmetics products experience rapid and frequent changes in customer demand. This gives the retail "brick and mortar" cosmetics business a unique set of technical challenges with respect to improvement in the efficiency and responsiveness of systems that update and change planograms and retail cosmetics displays to meet current and expected inventory, product demand and take into account market trends and current sales data to properly display the cosmetics products in stores according to brand and manufacturer requirements, while also reducing overages, costs and unwanted or outdated inventory. The present disclosure includes technological advancements that solves these technical problems, including an enterprise software platform that centralizes knowledge and empowers its users to share information thereby increasing automation and efficiency in the operations of the computer networks, graphical user interfaces and databases for cosmetics retail displays to be responsive to retail store and customer requirements and increase performance of such systems.

Such advancements are provided by the cosmetics retail displays management system 102 disclosed herein which integrates information from various, often disparate and remotely located systems and databases, involved in the manufacturing and supply of retail display components for various cosmetics products to a diverse set of retail store locations. The cosmetics retail displays management system 102 disclosed herein presents such information in a unique manner within an improved graphical user interface that enables the users of such a system to have the information needed to more efficiently provide cosmetics retail displays and components, and updates to such displays, to various retail store locations according to current market data, sales, inventory and brand or manufacturer requirements.

For example, the cosmetics retail displays management system 102 disclosed herein integrates, for multiple retail store locations, data including, but is not limited to, data regarding: cosmetics products sales; cosmetics products market trends; cosmetics products inventory; cosmetics products retail display components; cosmetics products retail display components inventory; which cosmetics products are for display on which cosmetics products retail display components; orders for cosmetics products retail display components; orders for cosmetics retail products;

planograms; updates to planograms; locations of various cosmetics products retail display components; locations of various cosmetics products retail display components within a particular retail store; which cosmetics products retail display components are interchangeable, current locations of cosmetics retail products on cosmetics products retail display components currently being used; spare cosmetics products retail display components; renderings of physical point or sale (POS) locations; renderings of plans for physical POS locations; retail store physical dimensions; retail store POS area physical dimensions; retail store cosmetics display area physical dimensions; suppliers; retailers; clients; project managers; account managers; designers, developers; finance; print materials for cosmetics products retail display components; where cosmetics products are located on cosmetics products retail display relative to other cosmetics products located on the cosmetics products retail display; identification for cosmetics products retail display components; identification of cosmetics products, etc.

The cosmetics retail displays management system 102 may receive such data from various remote and disparate databases and systems in an automated and particularly unique manner to increase the efficiency of the operation of the designing, manufacturing, producing, allocating and/or delivering components of cosmetics products retail displays to various retail store locations. For example, the cosmetics retail displays management system 102 may receive such data as described above from one or more of the supplier systems 118, retailer systems 114, client systems 112, project manager systems 110, account manager systems 108, designer and developer systems 106, and finance systems 104, which play a role in the design, manufacturing, producing, allocating and/or delivering of components of cosmetics products retail displays to various retail store locations.

The networked environment 100 may include a plurality of systems that may be controlled and implemented by various different entities involved in the design, manufacturing, producing, allocating and/or delivering of components of cosmetics products retail displays to various retail store locations. Each system may comprise one or more systems, devices, processes, computers, databases, machines, computer networks and interfaces that facilitate different pieces of the operations and management of the design, manufacturing, producing, allocating and/or delivering of components of cosmetics products retail displays to various retail store locations, such as those related, but not limited to: proposals, design, artwork, style guides, approval, brand requirements, ordering, budgets, costs, locations, printing, materials, production, tracking, delivery and sales. For example, the networked environment 100 may include one or more: supplier systems 118, retailer systems 114, client systems 112, project manager systems 110, account manager systems 108, designer and developer systems 106, and finance systems 104. Such systems may store different types of data and perform different specific functions in the various pieces of the operations and management of the design, manufacturing, producing, allocating and/or delivering of components of cosmetics products retail displays to various retail store locations. However, in various embodiments, one or more of such systems shown in FIG. 1 may provide functionality and store data that are related to or overlap with each other.

The networked environment 100 includes a cosmetics retail displays management system 102, which may communicate with and/or extract data from a plurality of such systems shown in FIG. 1, and integrates, analyzes, formats, reorganizes and/or presents such integrated, analyzed, formatted, and/or reorganized data in a unique manner within an improved graphical user interface that enables the users of such a system to have the information needed to more efficiently provide cosmetics retail displays and components, and updates to such displays, to various retail store locations according to current market data, sales, inventory and brand or manufacturer requirements. The cosmetics retail displays management system 102 may also predict future supply shortages and overages, and make decisions or recommendations to make updates to planograms or cosmetics retail displays at various retail store locations based on the analysis of such data in a manner a human would not be able to do. In some embodiments, the another information provider system (not shown) may communicate with, extract, aggregate and/or analyze information from one or more of the supplier systems 118, retailer systems 114, client systems 112, project manager systems 110, account manager systems 108, designer and developer systems 106, and finance systems 104 in order to deliver such data in a format useful for the cosmetics retail displays management system 102.

In one example embodiment, the cosmetics retail displays management system 102, supplier systems 118, retailer systems 114, client systems 112, project manager systems 110, account manager systems 108, designer and developer systems 106, and finance systems 104 are all communicatively coupled via a computer/telecommunications network 116. Additional computing systems and service providers may also be present and included in the network environment 100, but are not illustrated for clarity of presentation.

The computer/telecommunications network 116 may be any telecommunications network, computer network or combination of telecommunications and computer networks that enables communication between the various devices connected to the network 116 shown in FIG. 1. The cosmetics retail displays management system 102, supplier systems 118, retailer systems 114, client systems 112, project manager systems 110, account manager systems 108, designer and developer systems 106, and finance systems 104 may be additionally or optionally linked by one or more other communication links or networks that comprise network 116. For example, a communications network of network 116 may include a local area network that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various devices and systems shown in FIG. 1. Thus, systems shown in FIG. 1 may have various applicable wireless transmitters and receivers and, in the case of using a Wi-Fi wireless link, may also have the corresponding executable Wi-Fi compatible network communications software that initiates, controls, maintains or manages the wireless link between the systems shown in FIG. 1 and the various other devices and systems within or connected to network 116 over the Wi-Fi signal of the network 116.

The network 116 may comprise connections to the systems shown in FIG. 1 that provide services to the systems shown in FIG. 1, and may itself represent multiple interconnected networks. For instance, wired and wireless enterprise-wide computer networks, intranets, extranets, and/or the Internet may be included in or comprise a part of network 116. Embodiments may include various types of communication networks including other telecommunications networks, cellular networks and other mobile networks. There may be any variety of computers, switching devices, routers, bridges, firewalls, edge devices, multiplexers, phone lines, cables, telecommunications equipment and other devices within network 116 and/or in the communications paths between the cosmetics retail displays management system 102, supplier systems 118, retailer systems 114, client systems 112, project manager systems 110, account manager systems 108, designer and developer systems 106, and finance systems 104. Some or all of such equipment of network 116 may be owned, leased or controlled by third-party service providers.

In accordance with an aspect of the disclosure, the cosmetics retail displays management system 102, supplier systems 118, retailer systems 114, client systems 112, project manager systems 110, account manager systems 108, designer and developer systems 106, and finance systems 104 may contain discrete functional program modules that might make use of an application programming interface (API), or other object, software, firmware and/or hardware, to request services of each other and/or one or more of the other entities within or connected to the network 116.

For example, communication can be provided over a communications medium, e.g., client and server systems running on any of the cosmetics retail displays management system 102, supplier systems 118, retailer systems 114, client systems 112, project manager systems 110, account manager systems 108, designer and developer systems 106, and finance systems 104. These client and server systems may be coupled to one another via transmission control protocol/internet protocol (TCP/IP) connection(s) for high-capacity communication. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. In the example of FIG. 1, the cosmetics retail displays management system 102 may a client requesting the services of the supplier systems 118, retailer systems 114, client systems 112, project manager systems 110, account manager systems 108, designer and developer systems 106, and finance systems 104. In other embodiments, and various circumstances, the supplier systems 118, retailer systems 114, client systems 112, project manager systems 110, account manager systems 108, designer and developer systems 106, and finance systems 104 may be clients requesting the services of the cosmetics retail displays management system 102. However, any entity in FIG. 1, including cosmetics retail displays management system 102, can be considered a client, a server, or both, depending on the circumstances.

One or more cellular towers and stations may be part of a cellular network that is part of the computer/telecommunications network 116 and may be communicatively linked by one or more communications networks or communication mediums within the computer/telecommunications network 116 (e.g., using a cellular or other wired or wireless signal) in order to facilitate sending and receiving information in the form of synchronous or asynchronous data. This communication may be over a wireless signal on the cellular network of network 116 using applicable combinations and layers of telecommunications and networking protocols and standards such as fourth generation of broadband cellular network technology (4G), Long Term Evolution (LTE), HTTP and TCP/IP, etc.

Although the physical environment of the network 116, including the cosmetics retail displays management system 102, supplier systems 118, retailer systems 114, client systems 112, project manager systems 110, account manager systems 108, designer and developer systems 106 and finance systems 104, may have connected devices such as computers, the physical environment may alternatively have or be described as comprising various digital devices such as smartphones, tablets, personal digital assistants (PDAs), laptop computers, etc., software objects such as interfaces, Component Object Model (COM) objects and the like.

There are a variety of systems, components, and network configurations that may also support distributed computing and/or cloud-computing environments within the network 116. For example, computing systems may be connected together within the network 116 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the network 116.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network such as network 116. In a distributed computing environment, program modules may be located in both local and remote memory storage devices.

Figure 2:
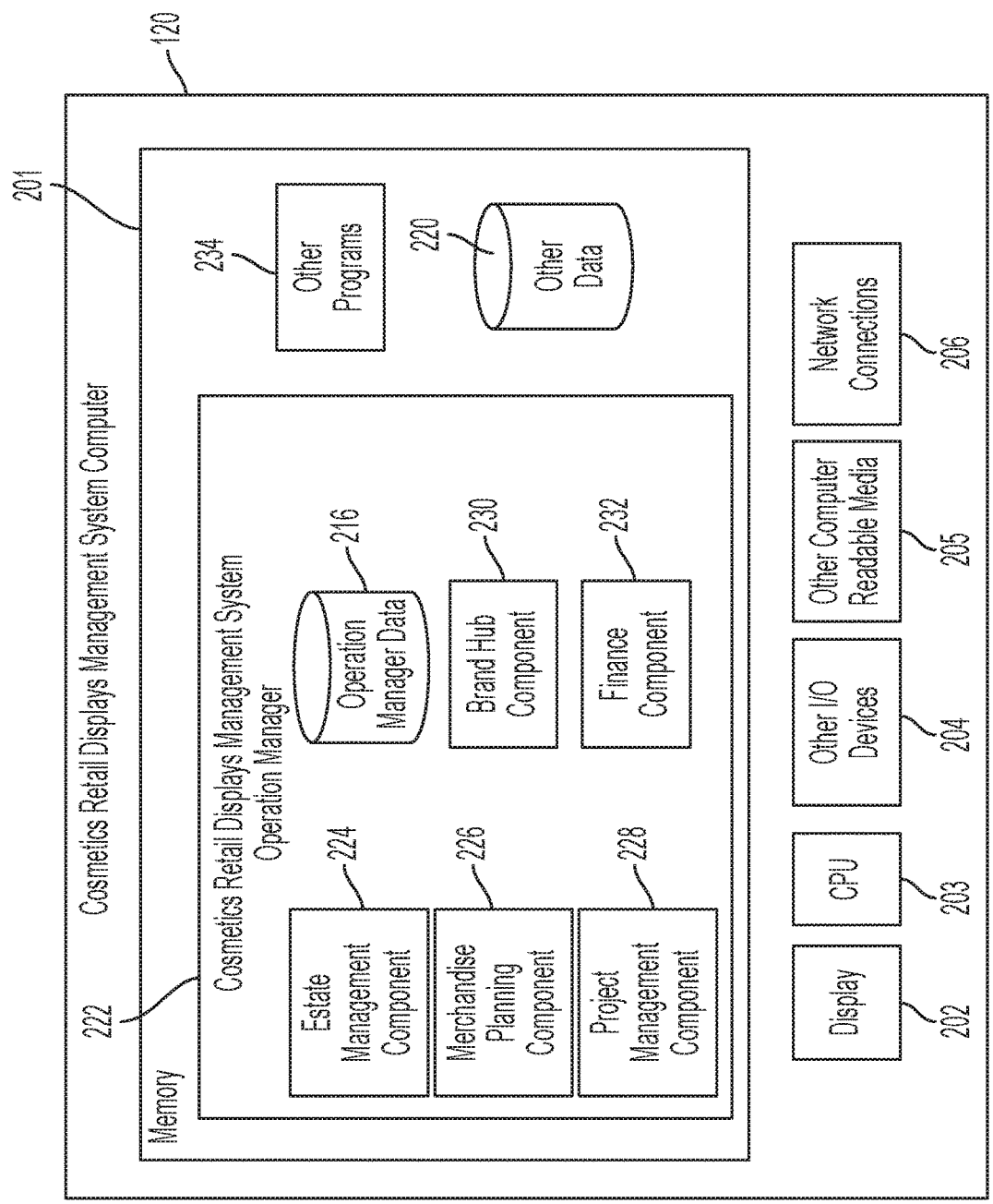
FIG. 2 is a schematic diagram of an example computer system that may comprise or be included in the items in the networked environment of FIG. 1, and which may be suitable for implementing systems, devices and methods for improved operations of computer networks, graphical user interfaces and databases for cosmetics retail displays, according to various aspects of the present disclosure.

FIG. 2 is a schematic diagram of an example computer system that may comprise or be included in the items in the networked environment of FIG. 1, and which may be suitable for implementing systems, devices and methods for improved operations of computer networks, graphical user interfaces and databases for cosmetics retail displays, according to various aspects of the present disclosure. In the example shown in FIG. 1, the computer system is a cosmetics retail displays management system computer 120 of the cosmetics retail displays management system 102. However, in various embodiments, some or all of the components, modules, connections, operation and functionality, or equivalents thereto, of the cosmetics retail displays management system computer 120 shown in FIG. 2 and/or described herein may also or instead, as applicable, be that of supplier systems 118, retailer systems 114, client systems 112, project manager systems 110, account manager systems 108, designer and developer systems 106, and finance systems 104 shown in FIG. 1 and perform the functionality of those devices as described herein.

The cosmetics retail displays management system computer 120 may facilitate management and tracking of assets including cosmetics retail display components located at various retail store locations; determining whether there exists sufficient display components at the various retail store locations to fulfill the marketing plan and current and expected inventory of cosmetics products; determining whether changes to a planogram or other changes to the cosmetics retail displays at individual retail store locations should occur and the designing and manufacturing of customized cosmetics retail displays at various retail store locations based on cosmetics products retail sales performance at the various retail store locations.

For example, the cosmetics retail displays management system operation manager 222 may facilitate receiving data representing at least one planogram for a plurality of cosmetics products for each of a plurality of retail store locations; receiving data regarding a plurality of display components for the plurality cosmetics products (the data regarding the plurality of display components for the cosmetics products including data identifying the plurality of display components for the cosmetics products and current different retail store locations of the plurality of display components for the cosmetics products); determining, based on the received data, whether there are sufficient display components for the plurality of cosmetics products located at each of the plurality of retail store locations to implement the at least one planogram for the plurality of cosmetics products for each of the plurality of retail store locations; and initiating services to supply one or more display components for the plurality of cosmetics products to one or more of the plurality of retail store locations based on the determination whether there are sufficient display components for the plurality of cosmetics products located at each of the plurality of retail store locations to implement the at least one planogram for the plurality of cosmetics products for each of the plurality of retail store locations.

As another example, the cosmetics retail displays management system operation manager 222 may facilitate receiving and processing data from supplier, retailer, client, project manager, account manager, designer or developer, and/or finance systems; and determining, based on received data, whether to initiate services to supply one or more display components for a plurality of cosmetic products to one or more of a plurality of retail store locations.

As an additional example, the cosmetics retail displays management system operation manager 222 may facilitate receiving sales data of cosmetics products that were displayed by at least one retail store location of a plurality of retail store locations according to a current planogram of the at least one retail store location; revising the current planogram of the at least one retail store location to generate a revised planogram; and initiating services to supply one or more display components for the plurality of cosmetics products to the at least one retail store location for implementing revised planogram.

Note that one or more general purpose or special purpose computing systems/devices may be used as part of or in conjunction with the cosmetics retail displays management system computer 120 to connect to various different entities and systems, including supplier systems 118, retailer systems 114, client systems 112, project manager systems 110, account manager systems 108, designer and developer systems 106, and finance systems 104. This is performed via the network connections 206.

In addition, in some embodiments, the cosmetics retail displays management system computer 120 may comprise one or more distinct computing systems/devices and may span distributed locations. Furthermore, each block shown may represent one or more such blocks as appropriate to a specific embodiment or may be combined with other blocks. Also, the cosmetics retail displays management system operation manager 222 may be implemented in software, hardware, firmware, or in some combination to achieve the capabilities described herein.

In the embodiment shown, cosmetics retail displays management system computer 120 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, other communication ports, and the like), other computer-readable media 205 and network connections 206. The cosmetics retail displays management system operation manager 222 is shown residing in memory 201.

In other embodiments, some portion of the contents and some, or all, of the components of the cosmetics retail displays management system operation manager 222 may be stored on and/or transmitted over the other computer-readable media 205. The components of the cosmetics retail displays management system computer 120 and operation manager 222, including the estate management component 224, merchandise planning component 226, project management component 228, brand hub component 230 and finance component 232, preferably execute on one or more CPUs 203 and facilitate management and tracking of assets including cosmetics retail display components located at various retail store locations; determining whether there exists sufficient display components at the various retail store locations to fulfill the marketing plan and current and expected inventory of cosmetics products; determining whether changes to a planogram or other changes to the cosmetics retail displays at individual retail store locations should occur and the designing and manufacturing of customized cosmetics retail displays at various retail store locations based on cosmetics products retail sales performance at the various retail store locations. Such operations may be based on data collected by the cosmetics retail displays management system operation manager 222 and stored in operation manager data storage repository 216. For example, such data may include, but is not limited to, data regarding: cosmetics products sales; cosmetics products market trends; cosmetics products inventory; cosmetics products retail display components; cosmetics products retail display components inventory; which cosmetics products are for display on which cosmetics products retail display components; orders for cosmetics products retail display components; orders for cosmetics retail products; planograms; updates to planograms; locations of various cosmetics products retail display components; locations of various cosmetics products retail display components within a particular retail store; which cosmetics products retail display components are interchangeable, current locations of cosmetics retail products on cosmetics products retail display components currently being used; spare cosmetics products retail display components; renderings of physical point or sale (POS) locations; renderings of plans for physical POS locations; retail store physical dimensions; retail store POS area physical dimensions; retail store cosmetics display area physical dimensions; suppliers; retailers; clients; project managers; account managers; designers, developers; finance; print materials for cosmetics products retail display components; where cosmetics products are located on cosmetics products retail display relative to other cosmetics products located on the cosmetics products retail display; identification for cosmetics products retail display components; identification of cosmetics products, etc.

Other code or programs 230 (e.g., further data processing modules, a user interface manager module, a Web server, and the like), and potentially other data repositories, such as other data repository 220 for storing other data (customer or user profiles, style guides, artwork, concept designs, messages, expenses timesheets, budgets, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the cosmetics retail displays management system computer 120 and operation manager 222 include an application program interface ("API") that provides programmatic access to one or more functions of the cosmetics retail displays management system computer 120 and operation manager 222. For example, such an API may provide a programmatic interface to one or more functions of the cosmetics retail displays management system operation manager 222 that may be invoked by one of the other programs 234 and/or one or more devices shown in FIG. 1, such as supplier systems 118, retailer systems 114, client systems 112, project manager systems 110, account manager systems 108, designer and developer systems 106, and finance systems 104. In this manner, the API may facilitate the development of third-party software, such as various different service applications, user interfaces, plug-ins, adapters (e.g., for integrating functions of the Cosmetics retail displays management system operation manager into desktop applications), and the like to facilitate establishing secure remote connections to media devices using the cosmetics retail displays management system computer 120 and other remote devices.

In an example embodiment, components/modules of the cosmetics retail displays management system computer 120 and cosmetics retail displays management system operation manager 222 are implemented using standard programming techniques. For example, the cosmetics retail displays management system operation manager 222 may be implemented as a "native" executable running on the CPU 203, along with one or more static or dynamic libraries. In other embodiments, the cosmetics retail displays management system computer 120 and operation manager 222 may be implemented as instructions processed by a virtual machine that executes as one of the other programs 234. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the cosmetics retail displays management system computer 120 to perform the functions of the cosmetics retail displays management system operation manager 222. In one embodiment, instructions cause the CPU 203 or some other processor, such as an I/O controller/processor, to connect to receive data representing at least one planogram for a plurality of cosmetics products for each of a plurality of retail store locations; receive data regarding a plurality of display components for the plurality cosmetics products (the data regarding the plurality of display components for the cosmetics products including data identifying the plurality of display components for the cosmetics products and current different retail store locations of the plurality of display components for the cosmetics products); determine, based on the received data, whether there are sufficient display components for the plurality of cosmetics products located at each of the plurality of retail store locations to implement the at least one planogram for the plurality of cosmetics products for each of the plurality of retail store locations; and initiate services to supply one or more display components for the plurality of cosmetics products to one or more of the plurality of retail store locations based on the determination whether there are sufficient display components for the plurality of cosmetics products located at each of the plurality of retail store locations to implement the at least one planogram for the plurality of cosmetics products for each of the plurality of retail store locations.

Instructions stored in a memory also configure, when executed, one or more processors of the cosmetics retail displays management system computer 120 to receive and process data from supplier, retailer, client, project manager, account manager, designer or developer, and/or finance systems; and determine, based on received data, whether to initiate services to supply one or more display components for a plurality of cosmetic products to one or more of a plurality of retail store locations.

Instructions stored in a memory also configure, when executed, one or more processors of the cosmetics retail displays management system computer 120 to receive sales data of cosmetics products that were displayed by at least one retail store location of a plurality of retail store locations according to a current planogram of the at least one retail store location; revise the current planogram of the at least one retail store location to generate a revised planogram; and initiate services to supply one or more display components for the plurality of cosmetics products to the at least one retail store location for implementing revised planogram.

The embodiments described above may also use wellknown or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by the cosmetics retail displays management system operation manager 222 implementation. Also, other functions could be implemented and/or performed by each component/module, and in different orders, and by different components/modules, yet still achieve the functions of the cosmetics retail displays management system computer 120 and cosmetics retail displays management system operation manager 222.

In addition, programming interfaces to the data stored as part of the cosmetics retail displays management system computer 120 and operation manager 222, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The operation manager data storage repository 216 and other data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the cosmetics retail displays management system operation manager 222.

Furthermore, in some embodiments, some or all of the components of the cosmetics retail displays management system computer 120 and cosmetics retail displays management system operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
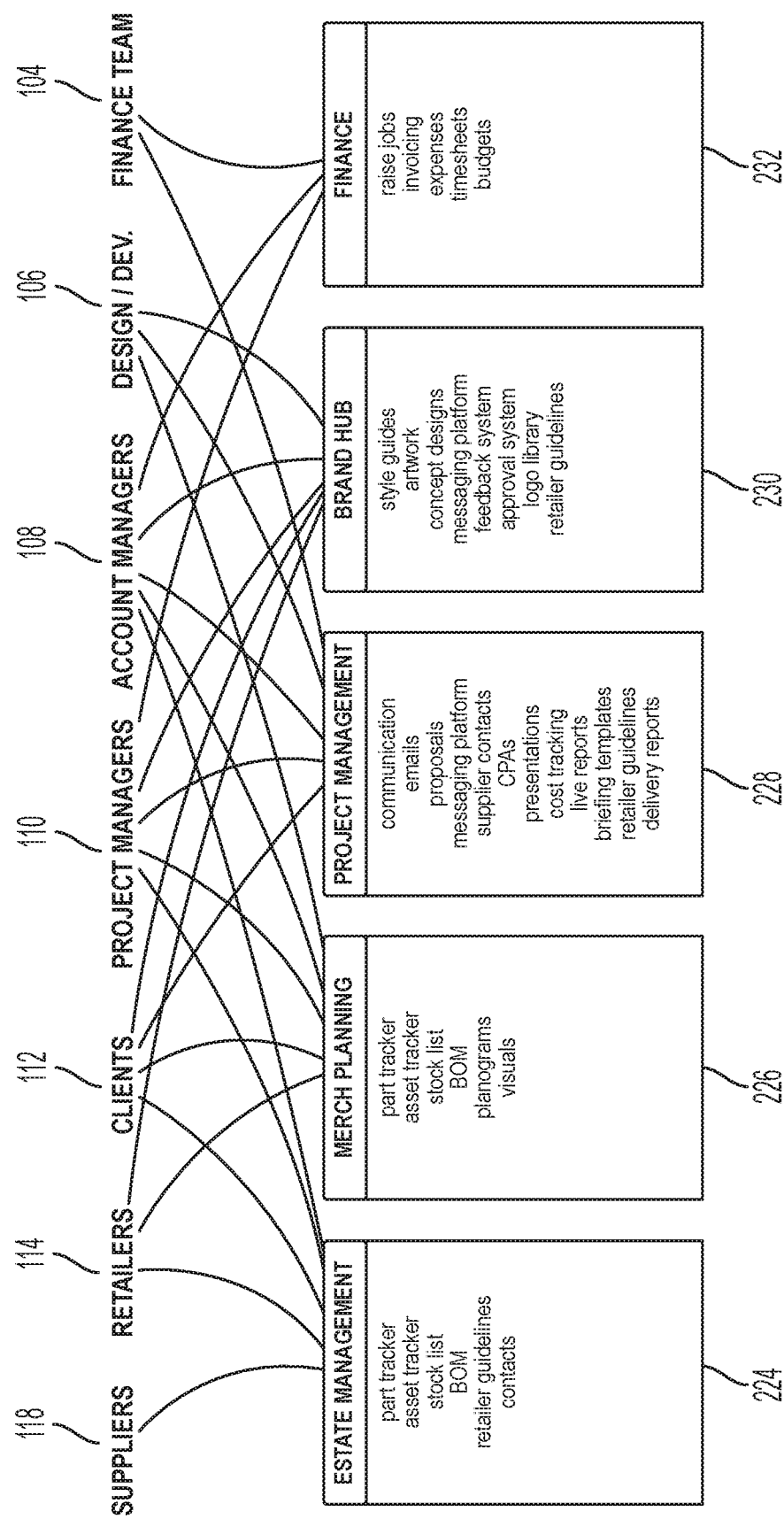
FIG. 3 is block diagram showing an example of various communication and operational links between various system components of the items in FIG. 1 and the components of the cosmetics retail displays management system operation manager of FIG. 2 provided by the cosmetics retail displays management system, according to various aspects of the present disclosure.

FIG. 3 is block diagram showing an example of various communication and operational links between various system components of the items in FIG. 1 and the components of the cosmetics retail displays management system operation manager 222 of FIG. 2 provided by the cosmetics retail displays management system 102, according to various aspects of the present disclosure.

The estate management component 224 may implement operational aspects of the cosmetics retail displays management system operation manager 222 each associated with various different individual retail stores, including, but not limited to, a cosmetics retail display part tracker and a cosmetics retail display asset tracker. In implementing and operating such operational aspects of the cosmetics retail displays management system operation manager 222, the estate management component 202 may also include, implement and/or have access various data components associated with various different individual retail stores including, but not limited to, stock lists, bill of materials (BOM), retailer guidelines and contacts. The estate management component 224 may have and/or establish various communication and operational links between various system components of the items in FIG. 1 to facilitate providing such functionality. For example, the estate management component 202 may have and/or establish various communication and operational links between the supplier systems 118, retailer systems 114, client systems 112, project manager systems 110 and account manager systems 108. In other embodiments, various communication and operational links between the estate management component 224 and other systems shown in FIG. 1 may exist.

The merchandise planning component 226 may implement operational aspects of the cosmetics retail displays management system operation manager 222 each associated with various different individual retail stores, including, but not limited to, a part tracker and an asset tracker. In implementing and operating such operational aspects of the cosmetics retail displays management system operation manager 222, the merchandise planning component 226 may also include, implement and/or have access various data components associated with various different individual retail stores including, but not limited to, stock lists, bill of materials (BOM), planograms and visuals. The merchandise planning component 226 may have and/or establish various communication and operational links between various system components of the items in FIG. 1 to facilitate providing such functionality. For example, the merchandise planning component 226 may have and/or establish various communication and operational links between the retailer systems 114, client systems 112, project manager systems 110, account manager systems 108 and designer and developer systems 106. In other embodiments, various communication and operational links between the estate merchandise planning component 226 and other systems shown in FIG. 1 may exist.

The project management component 228 may implement operational aspects of the cosmetics retail displays management system operation manager 222 each associated with various different individual retail stores, including, but not limited to, a messaging platform, contact management platform and cost tracking platform. In implementing and operating such operational aspects of the cosmetics retail displays management system operation manager 222, the project management component 228 may also include, implement and/or have access various data components associated with various different individual retail stores including, but not limited to communications, emails, proposals, supplier contacts, CPAs, presentations, live reports, briefing templates, retailer guidelines and delivery reports. The project management component 228 may have and/or establish various communication and operational links between various system components of the items in FIG. 1 to facilitate providing such functionality. For example, the project management component 228 may have and/or establish various communication and operational links between the client systems 112, project manager systems 110, account manager systems 108, designer and developer systems 106, and finance systems 104. In other embodiments, various communication and operational links between the project management component 228 and other systems shown in FIG. 1 may exist.

The brand hub component 230 may implement operational aspects of the cosmetics retail displays management system operation manager 222 each associated with various different individual retail stores, including, but not limited to, a messaging platform, a feedback system, and an approval system. In implementing and operating such operational aspects of the cosmetics retail displays management system operation manager 222, the brand hub component 230 may also include, implement and/or have access various data components associated with various different individual retail stores including, but not limited to style guides, artwork, concept designs, logo library and retailer guidelines. The brand hub component 230 may have and/or establish various communication and operational links between various system components of the items in FIG. 1 to facilitate providing such functionality. For example, the brand hub component 230 may have and/or establish various communication and operational links between the client systems 112, project manager systems 110, account manager systems 108 and designer and developer systems 106. In other embodiments, various communication and operational links between the brand hub component 230 and other systems shown in FIG. 1 may exist.

The finance component 232 may implement operational aspects of the cosmetics retail displays management system operation manager 222 each associated with various different individual retail stores, including, but not limited to, a raise jobs system and an invoicing system. In implementing and operating such operational aspects of the cosmetics retail displays management system operation manager 222, the finance component 232 may also include, implement and/or have access various data components associated with various different individual retail stores including, but not limited to invoices, expenses, timesheets and budgets. The finance component 232 may have and/or establish various communication and operational links between various system components of the items in FIG. 1 to facilitate providing such functionality. For example, the finance component 232 may have and/or establish various communication and operational links between the project manager systems 110, account manager systems 108 and finance systems 104. In other embodiments, various communication and operational links between the finance component 232 and other systems shown in FIG. 1 may exist.

In one example embodiment, each cosmetics display component received at an individual retail store is scanned in at the retail store via a bar code scanner or other identification reader and sent to the part tracker of the estate management system 224. In this manner, the estate management component 224 may electronically receive identification data identifying each cosmetics display component located at the various individual retail stores. The cosmetics retail displays management system operation manager 222 may determine a particular retail store requires an additional cosmetics display based on the sales performance of particular cosmetics at that store. The merchandise planning component 226 may build or facilitate the building of a planogram based on a correlation between what cosmetic products sell best when next to other cosmetics products. In this manner, the planogram may be built in a revenue-optimized manner. The merchandise planning component 226 may also build or facilitate the building of the planogram, enabling one to drag and drop components into a representation of the physical display. The print material requirements for the cosmetics retail display according to the planogram and information from the brand hub component 230 may be sent via the merchandise planning component 226 and/or project management component 228 to a portal provided by the project management component for vendors to bid on doing the printing work. The merchandise planning component 226 and/or project management component 228 may then select the winning bid and initiate printing or artwork services that are needed associated with the planogram and the display components in response to the receiving the bids for printing or artwork services that are needed.

Based on information from the estate management component 224, the merchandise planning component 226 and/or project management component 228 may also determine which spare cosmetics retail display components are available at the retail store or other retail stores to fulfill the need or whether new cosmetics retail display components need to be ordered. The project management component 228 may then initiate services to supply such display components for the retail store location based on the determination. This may include, but is not limited to, initiating an order, production and/or delivery of one or more cosmetics retail display components. Such may be initiated by initiating an electronic communication via the project management component 228 to suppliers systems 118 to trigger the order, production and/or delivery of one or more cosmetics retail display components and/or actually performing the production and/or delivery of the one or more cosmetics retail display components. Once the services to supply such display components for the retail store location are initiated, the asset and part tracking systems of the estate management component 224 and merchandise planning component 226 may be updated by the cosmetics retail displays management system operation manager 222.

Figure 4:
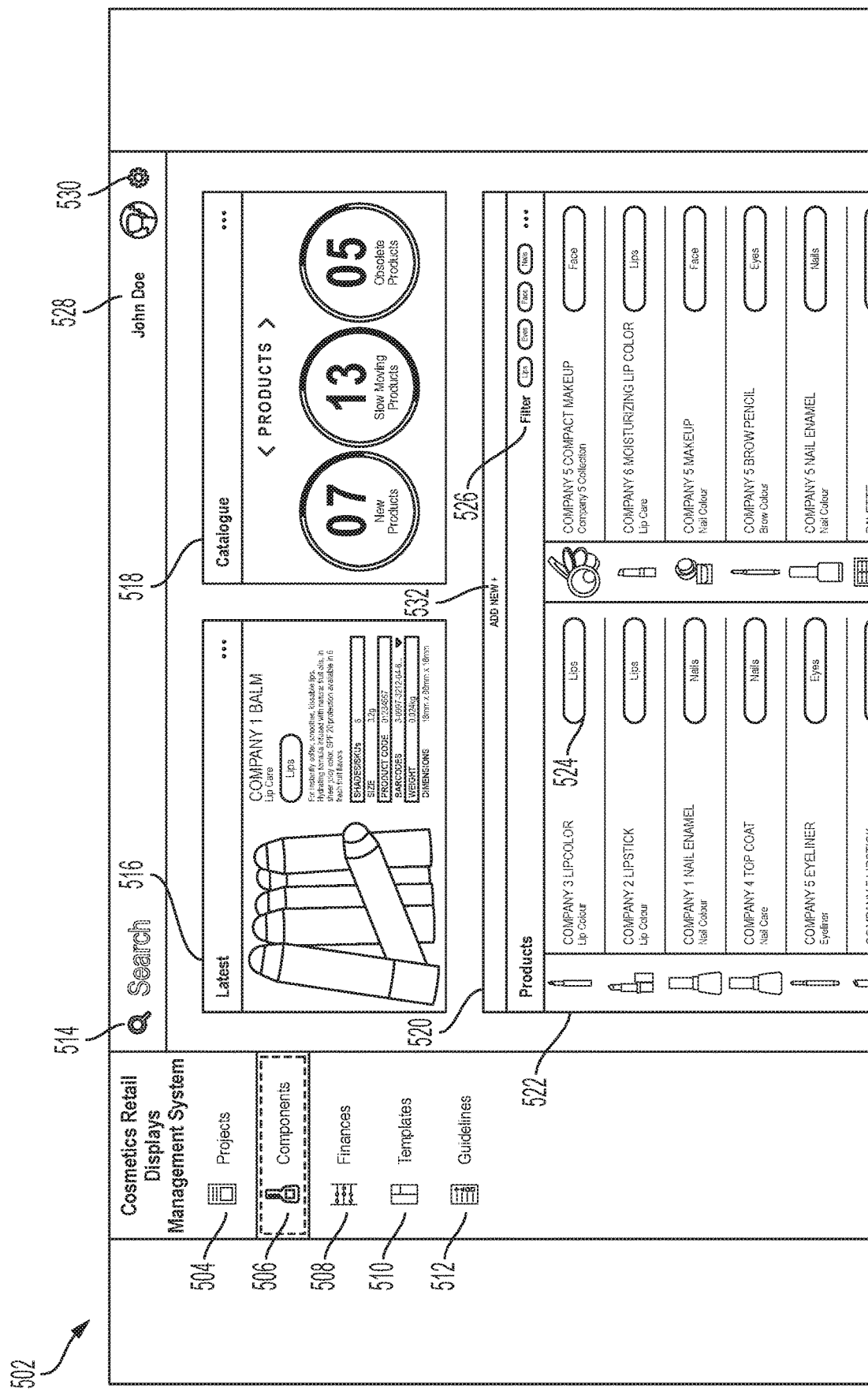
FIG. 4 is an example screen shot of an example graphical user interface screen of a components menu of the cosmetics retail displays management system, including a selectable list of various cosmetics products, according to various aspects of the present disclosure.

The various components shown in FIG. 3 may be functional modules and/or data modules, and may be accessible by one or more of the supplier systems 118, retailer systems 114, client systems 112, project manager systems 110 and account manager systems 108. Such components preferably execute on one or more CPUs 203 and facilitate management and tracking of assets including cosmetics retail display components located at various retail store locations; determining whether there exists sufficient display components at the various retail store locations to fulfill the marketing plan and current and expected inventory of cosmetics products; determining whether changes to a planogram or other changes to the cosmetics retail displays at individual retail store locations should occur and the designing and manufacturing of customized cosmetics retail displays at various retail store locations based on cosmetics products retail sales performance at the various retail store locations. Each component shown may represent one or more such components as appropriate to a specific embodiment or may be combined with other components or modules. Also, the components may be implemented in software, hardware, firmware, or in some combination to achieve the applicable capabilities of each module. FIG. 4 is an example screen shot of a first example graphical user interface screen 502 of a components menu of the cosmetics retail displays management system 102, including a selectable list of various cosmetics products, according to various aspects of the present disclosure.

On the left of the example graphical user interface screen 502 is a selectable menu including a selectable projects menu item 504, components menu item 506, finances menu item 508, templates menu item 520 and guidelines menu item 512. The projects menu item 504, when selected, causes a menu for managing projects related to designing, producing and supplying cosmetics displays for various retail store locations. The components menu item 506, when selected, causes a menu to be displayed for managing components related to designing, producing and supplying cosmetics displays for various retail store locations. The components menu item 506 is shown as being currently selected in FIG. 4 and, thus, the menu for managing components related to designing, producing and supplying cosmetics displays for various retail store locations is currently displayed in graphical user interface screen 502. The term "components" herein refers to components of cosmetics retail displays as well as the various cosmetics products displayed thereon. The finances menu item 508, when selected, causes a menu to be displayed for managing finances related to designing, producing and supplying cosmetics displays for various retail store locations. The templates menu item 510, when selected, causes a menu to be displayed for generating and managing templates related to designing, producing and supplying cosmetics displays for various retail store locations. The guidelines menu item 512, when selected, causes a menu to be displayed for generating and accessing and managing guidelines related to designing, producing and supplying cosmetics displays for various retail store locations, such as retailer, brand and style guidelines.

Shown in the menu for managing components related to designing, producing and supplying cosmetics displays for various retail store locations is a selectable interactive "latest" user interface feature 516 that displays the latest cosmetic product or products added, selected or featured by the system or released by a manufacturer. For example, such cosmetics products may be added or indicated to be featured by various clients of the cosmetics retail displays management system 102. The "latest" product(s) shown may be based on products from one or more retail store locations and may be shown. For example, if the current user (shown logged in as John Doe 528) is associated with a particular retail store location, the "latest" product(s) shown may be based cosmetics products for that particular retail store location and displayed accordingly. A user may select the "latest" user interface feature 516 or user interface items within the "latest" user interface feature 516 to obtain more information regarding the product displayed in the "latest" user interface feature 516 corresponding to the item selected.

Also shown is a selectable interactive "catalogue" user interface feature 518 that categorizes and displays information regarding the new cosmetics products, slow moving cosmetics products and obsolete cosmetics products. For example, a total number of products within each category and a corresponding graph is displayed as part of the interactive "catalogue" user interface feature 518. The categorization may be based on product sales performance data from one or more retail store locations and may be shown, sorted or categorized based on and for individual retail store locations. For example, if the current user (shown logged in as John Doe 528) is associated with a particular retail store location, the data for the total number of products within each category (new cosmetics products, slow moving cosmetics products and obsolete cosmetics products) may be based on sales performance data of cosmetics products from that particular retail store location and displayed accordingly. A user may also select user interface items corresponding to the new cosmetics products, slow moving cosmetics products and obsolete cosmetics products to cause a list of the corresponding new cosmetics products, slow moving cosmetics products or obsolete products to be displayed.

Also shown is a selectable list of available cosmetics products 522 that may be displayed on cosmetics displays for various retail store locations. In various embodiments the selectable list of available cosmetics products 522 may indicate all cosmetics products that can be displayed on cosmetics displays for various retail store locations; available products that can be displayed on cosmetics displays for various retail store locations; a current inventory of cosmetics products available at a particular retail store location that are or can be displayed on cosmetics displays; all cosmetics products of a particular brand that can be displayed on cosmetics displays for various retail store locations; or a current inventory of cosmetics products available at a particular retail store location that are or can be displayed on cosmetic displays currently existing at the particular retail store location. Each product listing includes detailed information regarding that particular cosmetics product, including an image of the product, name and category. The selectable list of available cosmetics products 522 may be filtered according to product category by selection of the corresponding product category button 524 in each listing or by selection of a product category from a list of product categories 526 located at the top of the selectable list of available cosmetics products 522. Each listing in the selectable list of available cosmetics products 522 may be selectable to display further information regarding the selected cosmetics product, such as information regarding retail cosmetics displays and retail cosmetics display components for that particular selected product.

Also, shown is an interactive search feature 514 in which a user may enter search terms to search for relevant cosmetics products and cosmetics display components. Doing so will cause a search results page to appear that includes an interactive list of cosmetics products and/or cosmetics display components that match or otherwise relate to the search terms. An interactive settings feature 530 is selectable by a user to configure various system settings, defaults, user preferences and security of the cosmetics retail displays management system 102 and may be selectable on a per user basis. For example, a user may select as a default setting to filter lists to see certain product categories first. A user may also add a new cosmetics product to the system by selecting the "add new" products selectable user interface element 532 and providing the relevant information regarding the new cosmetics product.

Figure 5:
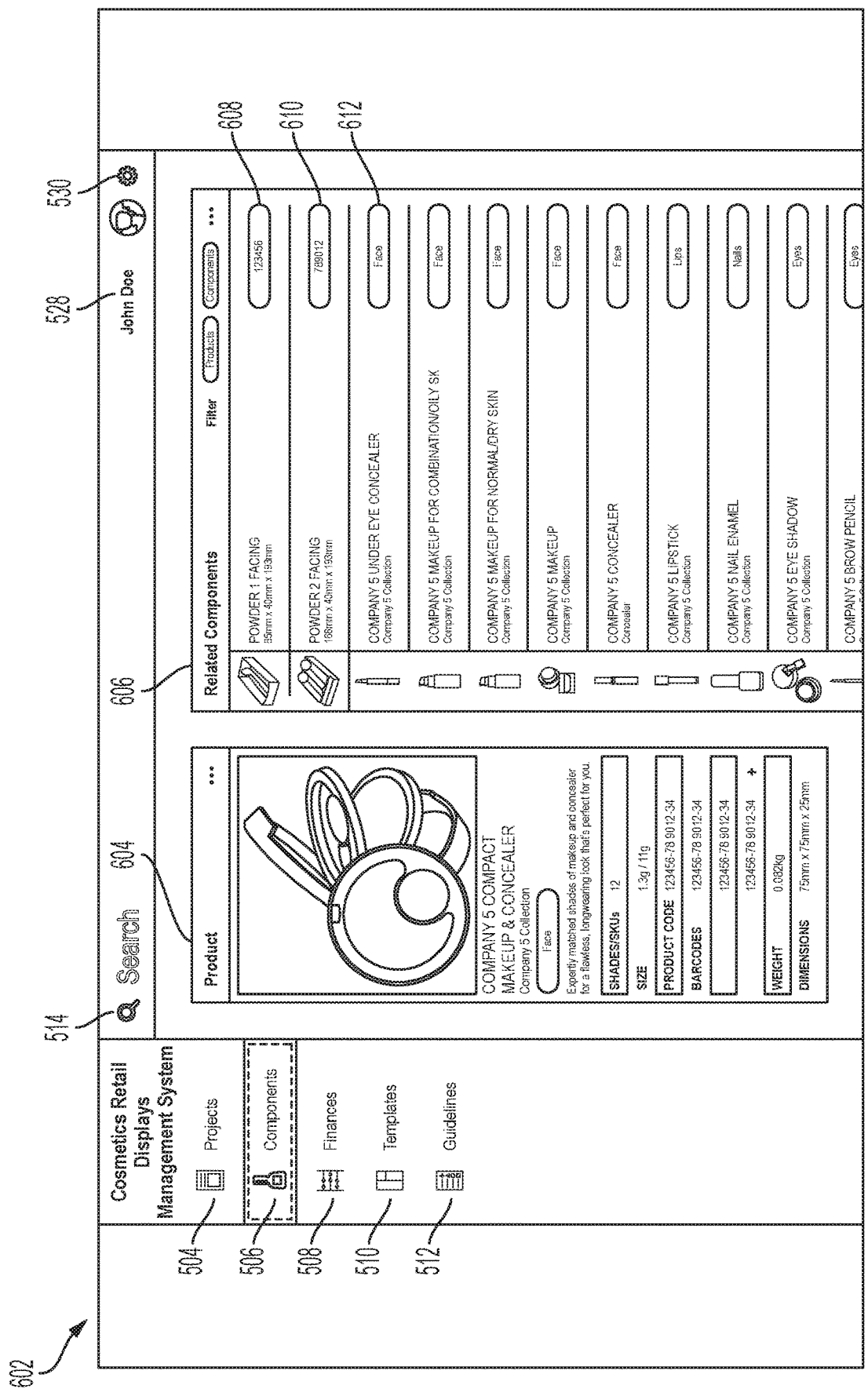
FIG. 5 is an example screen shot of an example graphical user interface screen of a components menu of the cosmetics retail displays management system, including a selected product and a selectable list of various components related to the selected product, according to various aspects of the present disclosure.

FIG. 5 is an example screen shot of a second example graphical user interface screen 602 of a components menu of the cosmetics retail displays management system 102, including a selected product 604 and a selectable list of various components 606 related to the selected product, according to various aspects of the present disclosure.

As described above regarding FIG. 4, each listing in the selectable list of available cosmetics products 522 may be selectable to display further information regarding the selected cosmetics product, such as information regarding retail cosmetics displays and retail cosmetics display components for that particular selected product. Shown in FIG. 5 is an example of what further information may be displayed by the cosmetics retail displays management system 102 when a product listing in the selectable list of available cosmetics products 522 of FIG. 4 is selected. For example, when the "Company 5 Compact Makeup and Concealer" product is selected from the selectable list of available cosmetics products 522 of FIG. 4, the selected product 604 is displayed with further information such as, for example, a product description, product category (e.g., "face"), shade/Stock Keeping Unit (SKU), product code, barcodes, weight, dimensions, etc. Shown next to or adjacent with the product 604 on the graphical user interface screen 602 is a selectable list of various components 606 related to the selected product. Such displayed related components may include, for example, related cosmetics display components and dimensions, such as "powder 1 facing" component 608 and "powder 2 facing" component 610. Such related cosmetics display components may be those which the corresponding product 604 may be displayed on or otherwise associated with. Also, shown are other cosmetics products related to the selected product 604 and their corresponding categories, such as "company 5 under eye concealer" 612, which is in category "face." The selectable list of various components 606 may also be filtered by a user selecting on a corresponding category element, such as "products" and "components." Selection of the "products" category will result in only related cosmetics products being displayed in the list and selection of the "components" category will result in only related cosmetics retail display components being displayed in the list. Each item in the selectable list of various components 606 may in turn be selected to show further information regarding that component and a corresponding list of components (including cosmetics products and cosmetics retail display components) related to the selected component.

Figure 6:
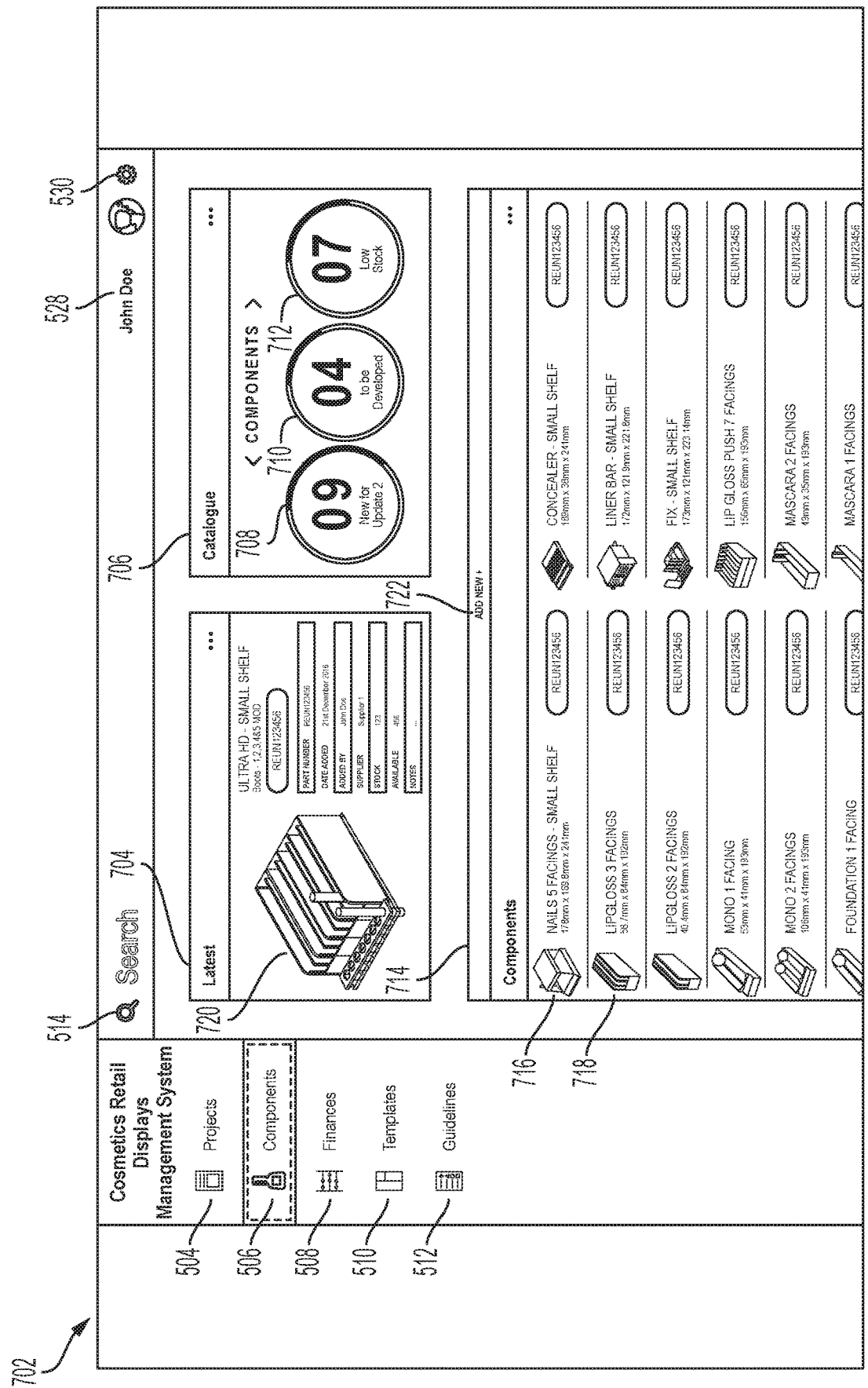
FIG. 6 is an example screen shot of an example graphical user interface screen of a components menu of the cosmetics retail displays management system, including a selectable list of various cosmetics display components, according to various aspects of the present disclosure.

FIG. 6 is an example screen shot of a third example graphical user interface screen 702 of a components menu of the cosmetics retail displays management system 102, including a selectable list of various cosmetics display components 714, according to various aspects of the present disclosure. Shown is a selectable interactive "latest" component user interface feature 704 that displays the latest cosmetics product display component or components added, selected or featured by the system, along with an image of the cosmetics display component 720 and detailed information, such as part number of the cosmetics display component, date the cosmetics display component was added to the system, who added the cosmetics display component to the system, the supplier of the cosmetics display component, the stock number of the cosmetics display component, how many of the cosmetics display component is available, and further notes regarding the cosmetics display component. For example, such cosmetics display components may be added or indicated to be featured by various clients of the cosmetics retail displays management system 102. The "latest" cosmetics display component shown may be based on cosmetics display components available from a supplier, or being used or available at one or more retail store locations. For example, if the current user (shown logged in as John Doe 528) is associated with a particular retail store location, the "latest" cosmetics display components shown may be based cosmetics display components available or being used for that particular retail store location. A user may select the "latest" component user interface feature 704 or user interface items within the "latest" component user interface feature 704 to obtain more information regarding the cosmetics display component displayed in the "latest" component user interface feature 704.

Also shown is a selectable interactive cosmetics display component "catalogue" user interface feature 706 that categorizes and displays information regarding new cosmetics display components for update 708, cosmetics display components to be developed 710 and low stock cosmetics display components 712. For example, a total number of cosmetics display components within each category and a corresponding graph is displayed. The categorization may be based on data received from systems shown in FIG. 1, such as the retailer systems 114, designer and developer systems 106, client systems 112 and project manager systems 110, as well as product sales performance data from one or more retail store locations, cosmetics product inventory data, and/or orders received or processed for cosmetics displays or components. Such information regarding total numbers of cosmetics display components may be shown, sorted or categorized based on and for individual retail store locations. For example, if the current user (shown logged in as John Doe 528) is associated with a particular retail store location, the data for the total number of cosmetics display components within each category (new cosmetics display components for update, cosmetics display components to be developed and low stock cosmetics display components) may be based on data regarding cosmetics products and cosmetics display components from that particular retail store location and displayed accordingly. A user may also select user interface items corresponding to the new cosmetics display components for update 708, cosmetics display components to be developed 710 and low stock cosmetics display components 712 to cause a list of the corresponding new cosmetics display components for update, cosmetics display components to be developed and low stock cosmetics display components to be displayed.

Also shown is a selectable list of cosmetics display components 714 that may display various corresponding cosmetic products for various retail store locations. In various embodiments, the selectable list of cosmetics display components 714 may indicate available cosmetics display components for all retail store locations; available cosmetics display components for a particular retail store location; an inventory of cosmetics display components currently being used at a particular retail store location; an inventory of spare cosmetics display components at a particular retail store location; an inventory of all spare cosmetics display components; an inventory of cosmetics display components for various retail store locations for a particular brand of cosmetics; or an inventory of cosmetics display components for a particular retail store location for a particular brand of cosmetics. Each cosmetics display component listing in the list of cosmetics display components 714 includes detailed information regarding that particular list of cosmetics display components 714, including an image of cosmetics display component, name, category, part number and dimensions. Each listing in the selectable list of cosmetics display components 714 may be selectable to display further information regarding the selected cosmetics display component, such as information regarding retail cosmetics products that may be displayed on the cosmetics display component, related retail cosmetics display components for that particular selected product retail stores at which the selected cosmetics display component is being used or is available, part number of the cosmetics display component, date the cosmetics display component was added to the system, who added the cosmetics display component to the system, the supplier of the cosmetics display component, the stock number of the cosmetics display component, how many of the cosmetics display component is available, and further notes regarding the cosmetics display component. A user may add a new cosmetics display component to the system by selecting the "add new" selectable user interface element 722 and providing the relevant information regarding the cosmetics display component.

Figure 7:
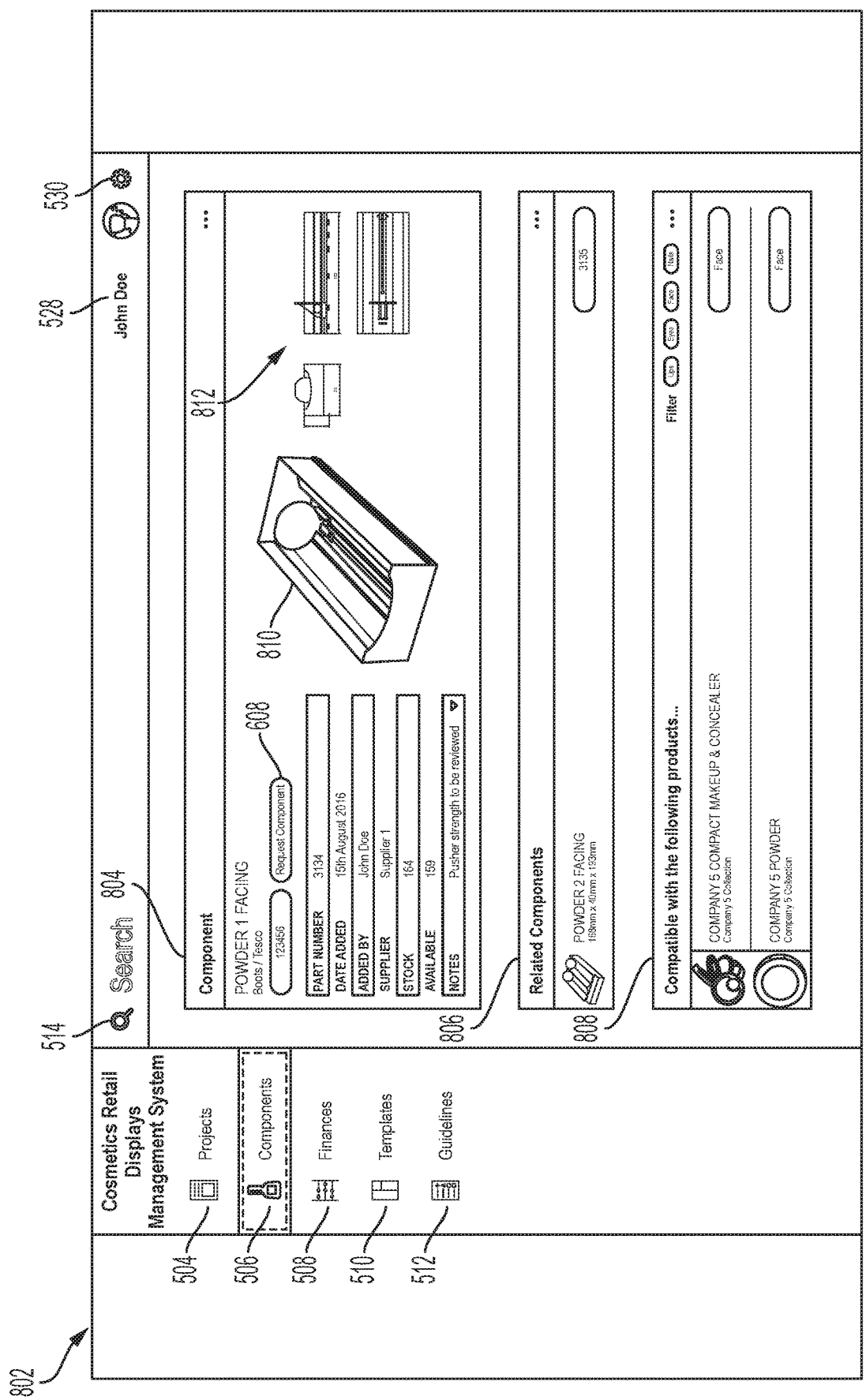
FIG. 7 is an example screen shot of an example graphical user interface screen of a components menu of the cosmetics retail displays management system, including a selected cosmetics display component and a selectable list of various components and compatible cosmetics products related to the selected cosmetics display component, according to various aspects of the present disclosure.

FIG. 7 is an example screen shot of a fourth example graphical user interface screen 802 of a components menu of the cosmetics retail displays management system 102, including a selected cosmetics display component 804 and a selectable list of various related cosmetics display components 806 and compatible cosmetics products 808 related to the selected cosmetics display component 804, according to various aspects of the present disclosure.

As described above regarding FIG. 6, each listing in the selectable list of selectable list of cosmetics display components 714 may be selectable to display further information regarding the selected cosmetics display component. Shown in FIG. 7 is an example of what further information may be displayed by the cosmetics retail displays management system 102 when a listing in the selectable list of selectable list of cosmetics display components 714 of FIG. 6 is selected. For example, when the "powder 1 facing" cosmetics display component is selected from the selectable list of cosmetics display components 714 of FIG. 6 (or from the selectable list of various components 606 of FIG. 5), the selected cosmetics display component 804 is displayed with further information such as, for example, an enlarged image 810 of the selected cosmetics display component, images if different views 812 of the selected cosmetics display component, part number of the cosmetics display component, date the cosmetics display component was added to the system, who added the cosmetics display component to the system, the supplier of the cosmetics display component, the stock number of the cosmetics display component, how many of the cosmetics display component is available (e.g., either generally or at specific retail store location), and further notes regarding the cosmetics display component. A "request component" selectable user interface element may also be displayed for a user to request the selected component. An automated process may be triggered by such a selection to initiate production, delivery and/or other services to supply the cosmetic display component to a particular retail store location.

Also shown is a list of compatible cosmetics products 808 related to the selected cosmetics display component 804. For example, such a list may indicate cosmetics products that may be displayed on or in the selected cosmetics display component 804, or are otherwise associated with the selected cosmetics display component 804. Also shown is a selectable list of various cosmetics display components 806 related to the selected cosmetics display component 804. For example, the list of various cosmetics display components 806 related to the selected cosmetics display component 804 may include cosmetics display components that are for the same or compatible products as those in the list of compatible cosmetics products 808 related to the selected cosmetics display component 804 and/or go together in the same cosmetics retail display unit.

Figure 8:
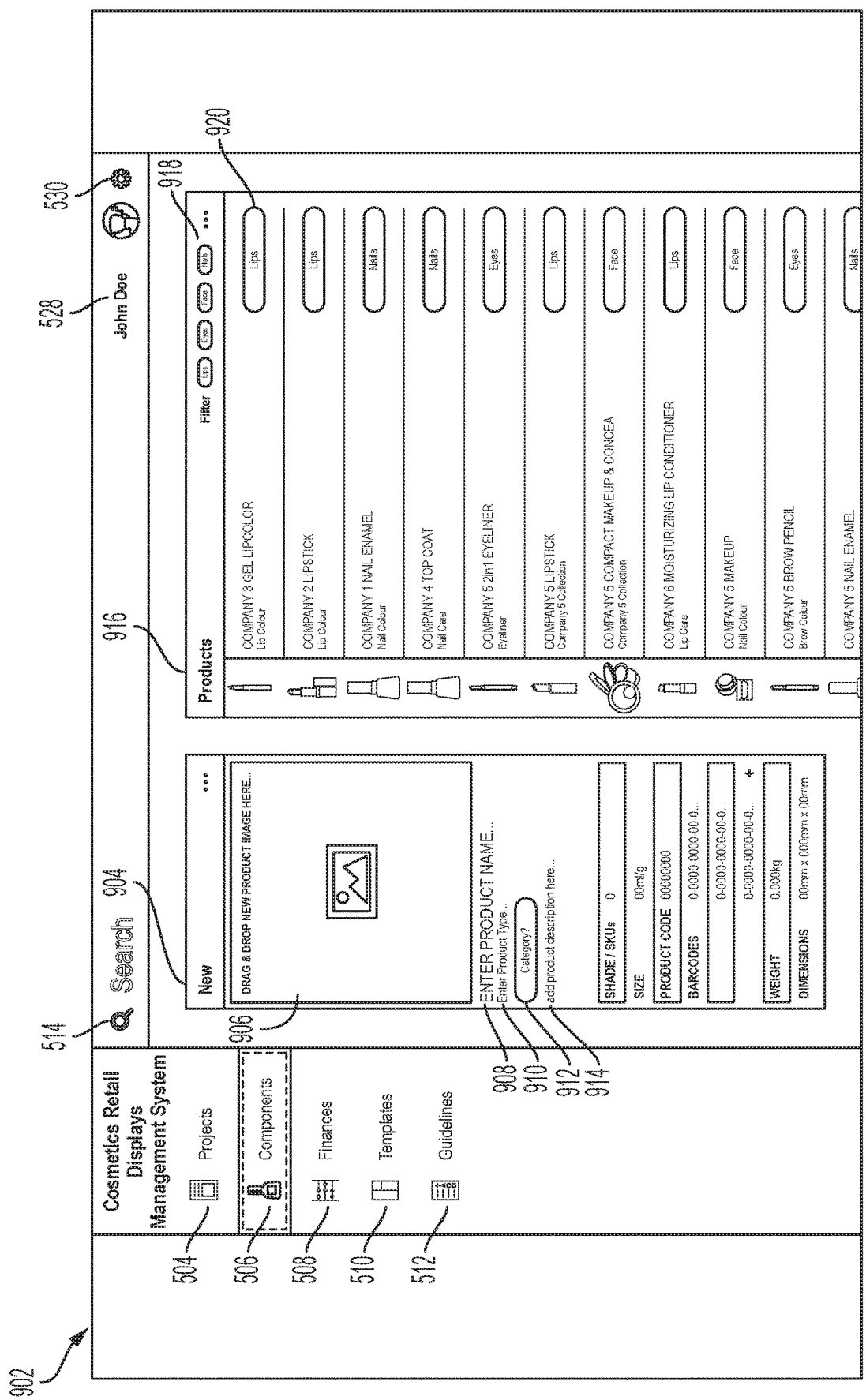
FIG. 8 is an example screen shot of an example graphical user interface screen of a components menu of the cosmetics retail displays management system, including a menu for adding a new cosmetics product, according to various aspects of the present disclosure.

FIG. 8 is an example screen shot of a fifth example graphical user interface screen 902 of a components menu of the cosmetics retail displays management system 102, including a menu 904 for adding a new cosmetics product, according to various aspects of the present disclosure. As described above regarding FIG. 4, a user may also add a new cosmetics product to the system by selecting the "add new" products selectable user interface element 532 of FIG. 4 and providing the relevant information regarding the new cosmetics product. For example, in response to a user selecting the "add new" products selectable user interface element 532 of FIG. 4, the menu 904 for adding a new cosmetics product is displayed. Interactive user interface elements may be displayed to enable the user to enter relevant information regarding the new cosmetics product, including, for example, product name 908, product type 910, product category 912 and product description 914. Also shown is a selectable list of current cosmetics products 916, which may be filtered by product category using a product category user interface selection element 918 or by selecting the corresponding product category (e.g., product category "lips" 920) from one of the cosmetics product listings in the selectable list of current cosmetics products 916. Once added, the newly added cosmetics product will appear in the adjacent selectable list of current cosmetics products 916.

Figure 9:
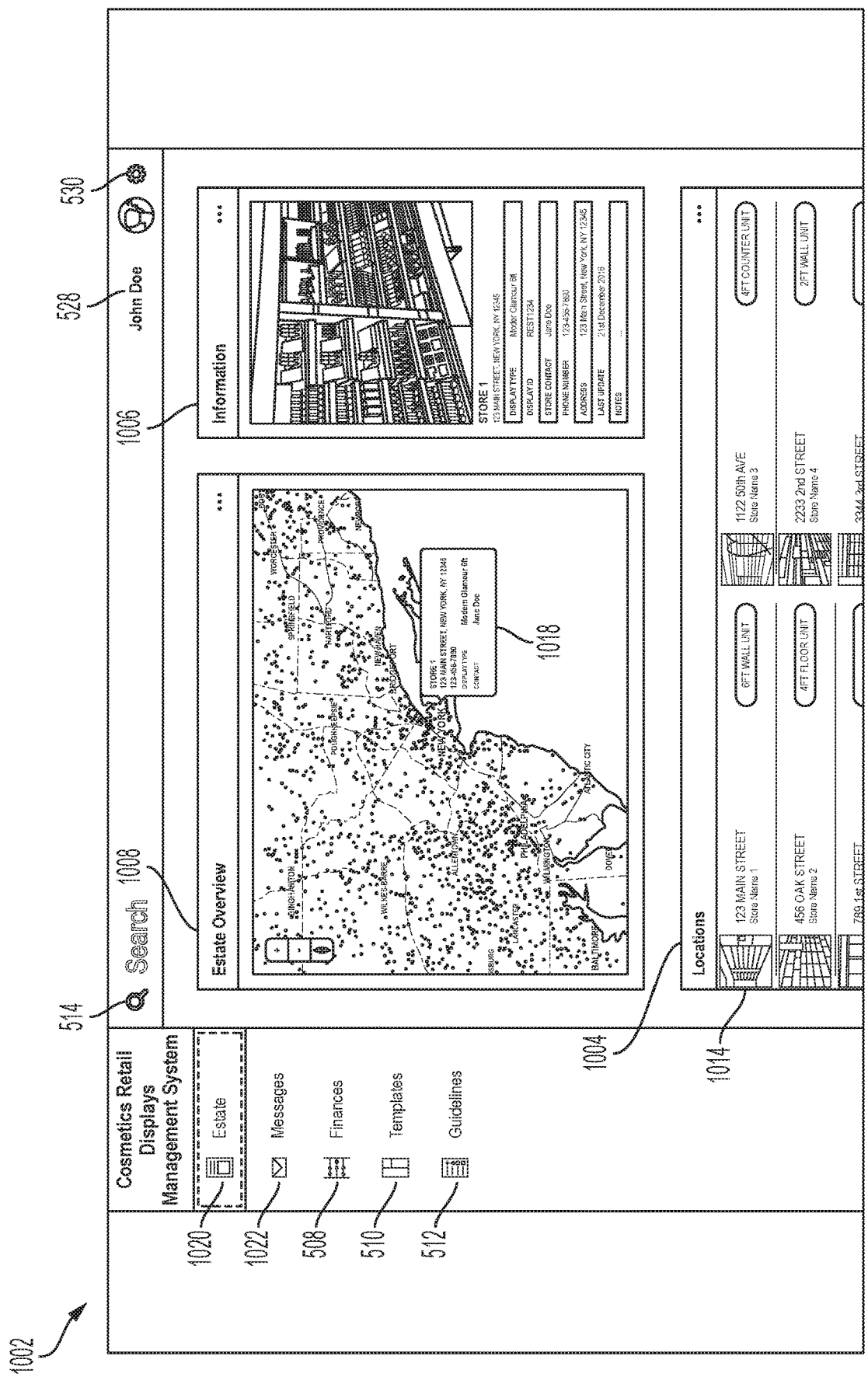
FIG. 9 is an example screen shot of an example graphical user interface screen of an estate menu of the cosmetics retail displays management system, including a selectable menu of retail store locations and corresponding cosmetics display information at each retail store location, according to various aspects of the present disclosure.

FIG. 9 is an example screen shot of an example graphical user interface screen 1002 of an estate menu of the cosmetics retail displays management system 102, including a selectable menu of retail store locations 1014 and corresponding cosmetics display information 906 at each retail store location, according to various aspects of the present disclosure.

The example graphical user interface screen 1002 may be displayed as a result of a user selecting the "estate" graphical user interface menu item 1020. Shown is a selectable estate overview map 1008, showing the location on the map 1008 of a selected retail store selected from the menu of retail store locations 1004. As a result of selection of a particular retail store location (e.g., retail store name 1 at 123 Main Street 1014) the estate overview map 1008 is shown with an indicator 1018 displayed at the location on the map 1008 corresponding to the location of the selected retail store 1014. Cosmetics display information 1006 for the selected retail store 1014 may also be displayed in response to the selected retail store 1014. Such information may include an image of the cosmetics retail display at the store, the store name, the store address, the display type, the store contact, the store phone number, the date the store information or retail display was last updated, and further notes regarding the selected retail store 1014 and/or the cosmetics retail display at the selected retail store 1014. In some embodiments, the user may also select the "messages" user interface element 1022 to see and manage messages associated with the current user logged in to the system (e.g., John Doe 528) and/or associated with the particular selected the selected retail store 1014 or cosmetic display located at the particular selected retail store 1014.

Figure 10:
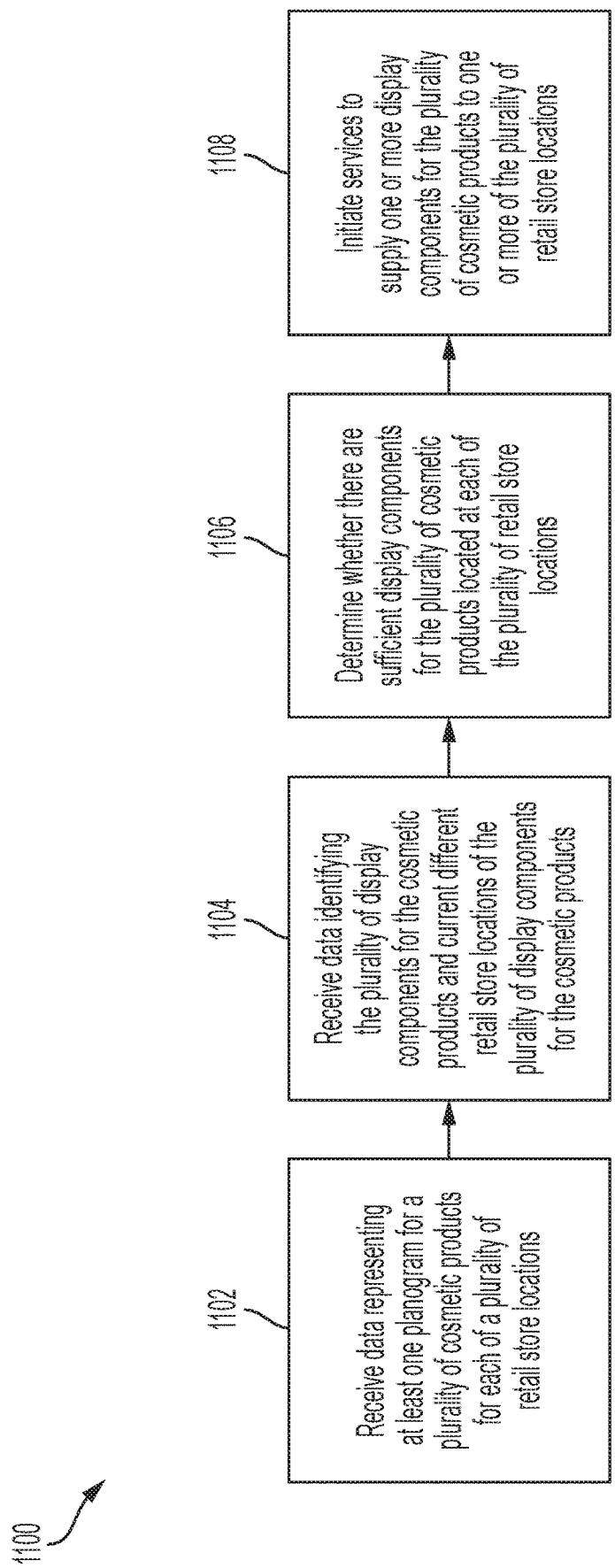
FIG. 10 is a flow diagram showing a method for initiating services to supply one or more display components for a plurality of cosmetics products to one or more of a plurality of retail store locations, according to various aspects of the present disclosure.

FIG. 10 is a flow diagram showing a method 1100 for initiating services to supply one or more display components for a plurality of cosmetics products to one or more of a plurality of retail store locations, according to various aspects of the present disclosure.

At 1102, the cosmetics retail displays management system 102 receives data representing at least one planogram for a plurality of cosmetics products for each of a plurality of retail store locations.

At 1104, the cosmetics retail displays management system 102 receives the data regarding the plurality of display components for the cosmetics products including data identifying the plurality of display components for the cosmetics products and current different retail store locations of the plurality of display components for the cosmetics products.

At 1106, the cosmetics retail displays management system 102 determining, based on the data representing at least one planogram for a plurality of cosmetics products and the data regarding the plurality of display components for the cosmetics products, whether there are sufficient display components for the plurality of cosmetics products located at each of the plurality of retail store locations to implement the at least one planogram for the plurality of cosmetics products for each of the plurality of retail store locations.

At 1108, the cosmetics retail displays management system 102 initiates services to supply one or more display components for the plurality of cosmetics products to one or more of the plurality of retail store locations based on the determination whether there are sufficient display components for the plurality of cosmetics products located at each of the plurality of retail store locations to implement the at least one planogram for the plurality of cosmetics products for each of the plurality of retail store locations. For each retail store location of the plurality of retail store locations, the cosmetics retail displays management system 102 may compare data representing a planogram for cosmetics products to be displayed at the retail store location with a current inventory of display components at the retail store location. The cosmetics retail displays management system 102 may then determine whether there are sufficient display components currently located the retail store location to implement the planogram for cosmetics products to be displayed at the retail store location based on the comparison of data representing the planogram for cosmetics products to be displayed at the retail store location with the current inventory of display components at the retail store location.

The cosmetics retail displays management system 102 may determine that there exists at least some spare display components at one or more other retail store locations of the plurality of retail store locations that may be used to implement the at least one planogram for the plurality of cosmetics products at the particular retail store location. The cosmetics retail displays management system 102 may then initiate services to supply the at least some spare display components at the one or more other retail store locations of the plurality of retail store locations to the particular retail store location based on the determination.

Figure 11:
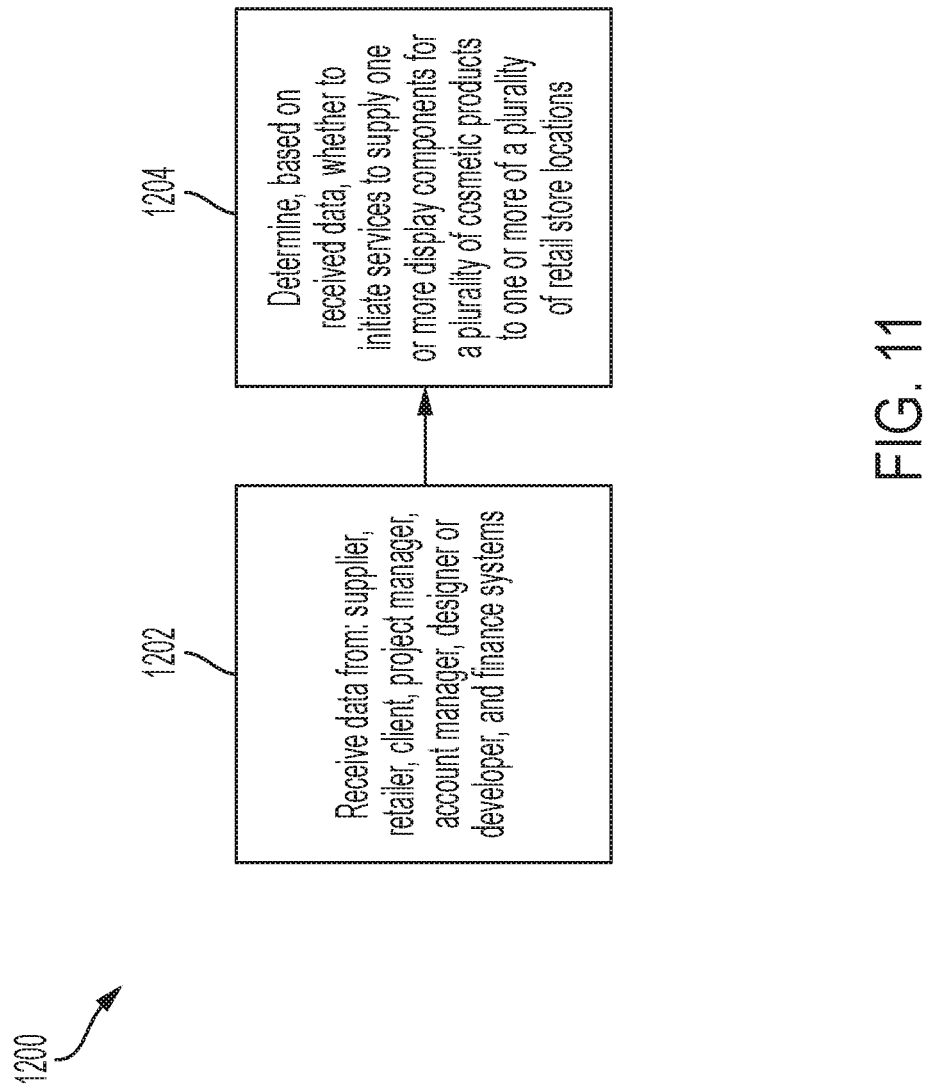
FIG. 11 is a flow diagram showing a method for determining whether to initiate services to supply one or more display components for a plurality of cosmetics products to one or more of a plurality of retail store locations, according to various aspects of the present disclosure.

FIG. 11 is a flow diagram showing a method 1200 for determining whether to initiate services to supply one or more display components for a plurality of cosmetics products to one or more of a plurality of retail store locations, according to various aspects of the present disclosure.

At 1202, the cosmetics retail displays management system 102 receives data from: supplier, retailer, client, project manager, account manager, designer or developer, and finance systems. For example, such systems may include a supplier system for display components for cosmetics products, a retailer system of display components for cosmetics products, a client system for display components for cosmetics products, a project manager system for display components for cosmetics products, an account manager system for display components for cosmetics products, a designer or developer system for display components for cosmetics products and a finance system for display components for cosmetics products.

At 1204, the cosmetics retail displays management system 102 determines, based on the received data from one or more of: the supplier, retailer, client, project manager, account manager, designer or developer, and finance systems, whether to initiate services to supply one or more display components for a plurality of cosmetics products to one or more of a plurality of retail store locations.

Figure 12:
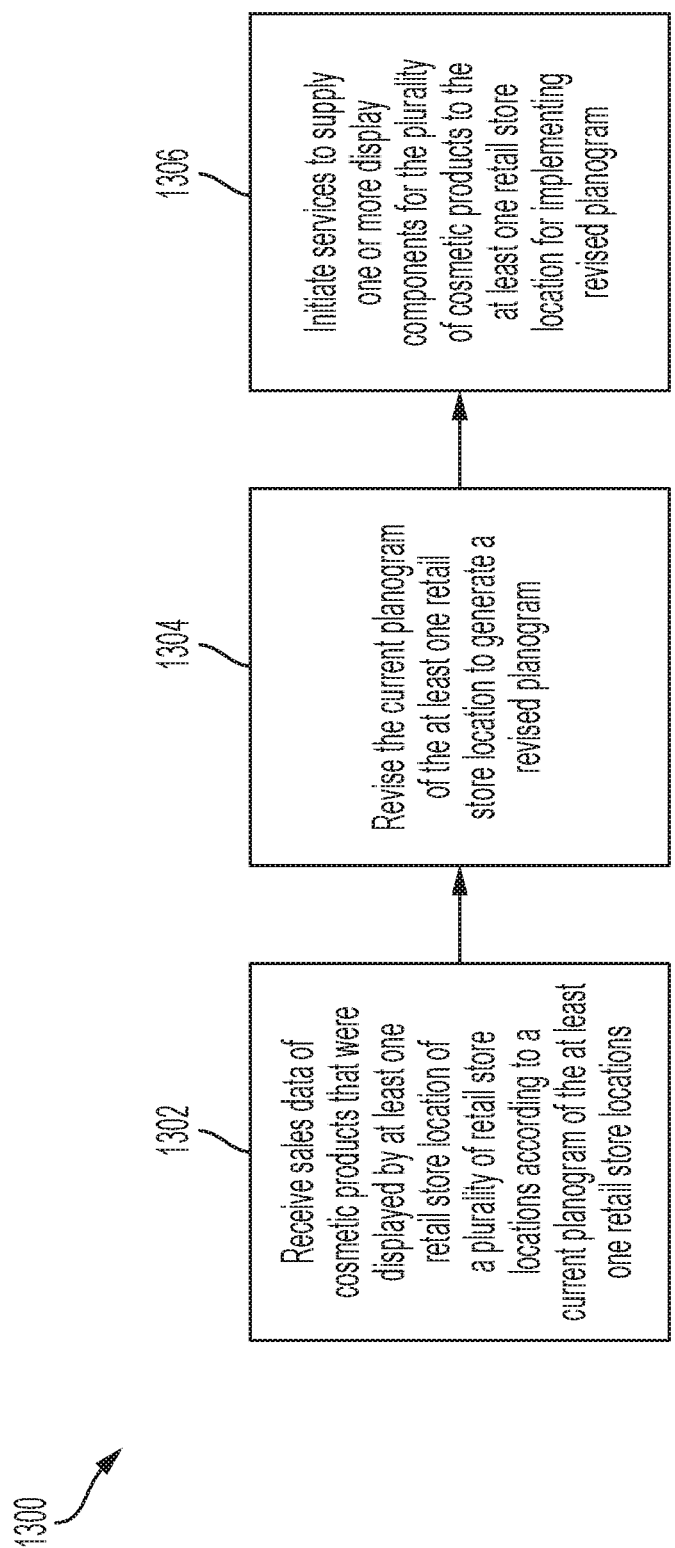
FIG. 12 is a flow diagram showing a method for initiating services to supply one or more display components for the plurality of cosmetics products to at least one retail store location for implementing revised planogram, according to various aspects of the present disclosure.

The cosmetics retail displays management system 102 may determine whether to initiate delivery of one or more display components for the plurality of cosmetics products to one or more of the plurality of retail store locations and determine whether to initiate printing, artwork or production services for producing one or more display components for the plurality of cosmetics products based on the received data. The cosmetics retail displays management system 102 may initiate services to supply one or more display components for the plurality of cosmetics products to one or more of the plurality of retail store locations by initiating one or more of: delivery of one or more display components for the plurality of cosmetics products to one or more of the plurality of retail store locations and initiating printing, artwork or production services for producing one or more display components for the plurality of cosmetics products FIG. 12 is a flow diagram showing a method 1300 for initiating services to supply one or more display components for the plurality of cosmetics products to at least one retail store location for implementing revised planogram, according to various aspects of the present disclosure.

At 1302, the cosmetics retail displays management system 102 receive sales data of cosmetics products that were displayed by at least one retail store location of a plurality of retail store locations according to a current planogram of the at least one retail store location.

At 1304, the cosmetics retail displays management system 102 revises the current planogram of the at least one retail store location to generate a revised planogram;

At 1306, the cosmetics retail displays management system 102 initiates services to supply one or more display components for the plurality of cosmetics products to the at least one retail store location for implementing revised planogram.

The cosmetics retail displays management system 102 may determine a revision to the current planogram of the at least one retail store location based on the sales data of cosmetics products that were displayed by the at least one retail store location according to the current planogram of the at least one retail store location. The revising of the current planogram of the at least one retail store location to generate the revised planogram may be based on the determination by the at least one computer processor of the revision to the current planogram.

The cosmetics retail displays management system 102 may determine the revision to the current planogram of the at least one retail store location based on the determined correlation between the cosmetics products that are placed in proximity to each other according to the current planogram and the sales performance of the cosmetics products that are placed in proximity to each other according to the current planogram.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary communication service provider systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as flash memory devices, hard disk drives, solid state drives, DVD ROMs, other computer memory and other non-transitory computer-readable storage media.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for electronically managing display components for cosmetics products, the method comprising:
at least one computer processor of a cosmetics retail displays management system receiving from a database via an automated application programming interface (API), data representing at least one planogram for a plurality of cosmetics products for each of a plurality of retail store locations;
the at least one computer processor of the cosmetics retail displays management system receiving from a database via an automated API, data regarding a plurality of display components for the plurality cosmetics products, the data regarding the plurality of display components for the cosmetics products including data identifying the plurality of display components for the cosmetics products and current different retail store locations of the plurality of display components for the cosmetics products;
the at least one computer processor of the cosmetics retail displays management system determining, based on the data representing at least one planogram for a plurality of cosmetics products and the data regarding the plurality of display components for the cosmetics products, whether there are sufficient display components for the plurality of cosmetics products located at each of the plurality of retail store locations to implement the at least one planogram for the plurality of cosmetics products for each of the plurality of retail store locations; and
the at least one computer processor of the cosmetics retail displays management system initiating a machine to supply one or more display components for the plurality of cosmetics products to one or more of the plurality of retail store locations by initiating an electronic action via a project management component of the cosmetics retail displays management system to cause one or more suppliers systems to trigger an order, production and/or delivery of the one or more display components based on the determination whether there are sufficient display components for the plurality of cosmetics products located at each of the plurality of retail store locations to implement the at least one planogram for the plurality of cosmetics products for each of the plurality of retail store locations.

2. The method of claim 1 wherein the determining whether there are sufficient display components for the plurality of cosmetics products located at each of the plurality of retail store locations to implement the at least one planogram includes:
for each retail store location of the plurality of retail store locations:
comparing, by at least one computer processor, data representing a planogram for cosmetics products to be displayed at the retail store location with a current inventory of display components at the retail store location; and
determining whether there are sufficient display components currently located the retail store location to implement the planogram for cosmetics products to be displayed at the retail store location based on the comparison of data representing the planogram for cosmetics products to be displayed at the retail store location with the current inventory of display components at the retail store location.

3. The method of claim 1 further comprising:
for at least one retail store location of the plurality of retail store locations:
receiving, by at least one computer processor, sales data of cosmetics products that were displayed at the at least one retail store location according to a current planogram of the at least one retail store location;
revising the current planogram of the at least one retail store location to generate a revised planogram; and
initiating, by at least one computer processor, services to supply one or more display components for the plurality of cosmetics products to the at least one retail store location for implementing revised planogram.

4. The method of claim 3, further comprising:
for the at least one retail store location of the plurality of retail store locations, determining, by at least one computer processor, a revision to the current planogram of the at least one retail store location based on the sales data of cosmetics products that were displayed at the at least one retail store location according to the current planogram of the at least one retail store location, wherein the revising the current planogram of the at least one retail store location to generate the revised planogram is performed by the at least one computer processor and is based on the determination by the at least one computer processor of the revision to the current planogram.

5. The method of claim 4 wherein the determining the revision to the current planogram of the at least one retail store location based on the sales data includes:
determining, by at least one computer processor, a correlation between cosmetics products that are placed according to the current planogram and sales performance of the cosmetics products that are placed according to the current planogram; and
determining the revision to the current planogram of the at least one retail store location based on the determined correlation between the cosmetics products that are placed according to the current planogram and the sales performance of the cosmetics products that are placed according to the current planogram.

6. The method of claim 3, further comprising:
repeating the receiving sales data, the revising the current planogram and the initiating services to supply one or more display components for each retail store location of the plurality of retail store locations.

7. The method of claim 1, further comprising:
determining, by at least one computer processor, that there are not sufficient display components at a particular retail store location of the plurality of retail store locations to implement the at least one planogram for the plurality of cosmetics products at the particular retail store location;
determining, by at least one computer processor, that there exist at least some spare display components at one or more other retail store locations of the plurality of retail store locations that may be used to implement the at least one planogram for the plurality of cosmetics products at the particular retail store location; and
initiating, by at least one computer processor, services to supply the at least some spare display components at the one or more other retail store locations of the plurality of retail store locations to the particular retail store location based on the determination that there exist at least some spare display components at the one or more other retail store locations of the plurality of retail store locations that may be used to implement the at least one planogram for the plurality of cosmetics products at the particular retail store location.

8. The method of claim 1, further comprising:
sending, by at least one computer processor, information regarding the at least one planogram and the one or more display components for printing or artwork services that are needed associated with the at least one planogram and the one or more display components for the plurality of cosmetics products based on a determination there are additional display components needed for the plurality of cosmetics products located at each of the plurality of retail store locations to implement the at least one planogram for the plurality of cosmetics products for each of the plurality of retail store locations;
receiving, by at least one computer processor, estimates for printing or artwork services that are needed associated with the at least one planogram and the one or more display components in response to the sending of the information regarding the at least one planogram and the one or more display components for printing or artwork services that are needed; and
initiating printing or artwork services that are needed associated with the at least one planogram and the one or more display components in response to the receiving the estimates for printing or artwork services that are needed associated with the at least one planogram and the one or more display components.

9. The method of claim 1, further comprising:
receiving, by at least one computer processor, a revision to the at least one planogram for a plurality of cosmetics products for each of a plurality of retail store locations;
determining, by at least one computer processor, based on the data representing at least one planogram for a plurality of cosmetics products and the data regarding the plurality of display components for the cosmetics products, whether there are sufficient display components for the plurality of cosmetics products located at each of the plurality of retail store locations to implement the revision to the at least one planogram for a plurality of cosmetics products for each of a plurality of retail store locations; and initiating, by at least one computer processor, services to supply one or more display components for the plurality of cosmetics products to one or more of the plurality of retail store locations based on the determination whether there are sufficient display components for the plurality of cosmetics products located at each of the plurality of retail store locations to implement the revision to the at least one planogram.

10. The method of claim 1 wherein the display components are one or more of stands, displays, shelves and racks for display of cosmetics products at one or more retail store locations of the plurality of retail store locations.

11. The method of claim 1, further comprising:
communicating, by at least one computer processor, with supplier systems for the plurality cosmetics products and for display components for the plurality cosmetics products; retailer systems for the plurality cosmetics products and for display components for the plurality cosmetics products; client systems for the plurality cosmetics products and for display components for the plurality cosmetics products; project manager systems for the plurality cosmetics products and for display components for the plurality cosmetics products; account manager systems for the plurality cosmetics products and for display components for the plurality cosmetics products; design or development systems for the plurality cosmetics products and for display components for the plurality cosmetics products; and finance systems for the plurality cosmetics products and for display components for the plurality cosmetics products, to facilitate providing services to supply one or more display components for the plurality of cosmetics products to one or more of the plurality of retail store locations.

12. The method of claim 11 further comprising:
for each retail store location of the plurality of retail store locations:
determining, by at least one computer processor, a revision to a current planogram of the retail store location based on information received from a plurality of the supplier systems, the retailer systems, the client systems, the project manager systems, the account manager systems, the design or development systems, and the finance systems; and
revising, by at least one computer processor, the current planogram of the retail store location to generate the revised planogram based on the determination by the at least one computer processor of the revision to the current planogram.

13. The method of claim 12, further comprising:
for each retail store location of the plurality of retail store locations:
determining, by at least one computer processor, based on the revised planogram for the retail store location, whether there are sufficient display components located at the retail store location to implement the revised planogram; and
initiating, by at least one computer processor, services to supply one or more display components for the plurality of cosmetics products to the retail store location based on the determination whether there are sufficient display components located at the retail store location to implement the revised planogram.

14. The method of claim 1 wherein the initiating services to supply one or more display components for the plurality of cosmetics products to one or more of the plurality of retail store locations includes initiating delivery of one or more display components for the plurality of cosmetics products to one or more of the plurality of retail store locations.

15. The method of claim 1 wherein the initiating services to supply one or more display components for the plurality of cosmetics products to one or more of the plurality of retail store locations includes initiating one or more of printing, artwork and production services for producing one or more display components for the plurality of cosmetics products.

16. A system for managing display components for cosmetics products, the system comprising:
at least one processor; and
at least one memory coupled to the at least one processor, the at least one memory having instructions thereon that, when executed by the at least one processor, cause the system for managing display components for cosmetics products to:
receive data from a supplier system for display components for cosmetics products, a retailer system of display components for cosmetics products, a client system for display components for cosmetics products, a project manager system for display components for cosmetics products, an account manager system for display components for cosmetics products, a designer or developer system for display components for cosmetics products, and a finance system for display components for cosmetics products; and
determine, based on the received data from one or more of the supplier system for display components for cosmetics products, the retailer system of display components for cosmetics products, the client system for display components for cosmetics products, the project manager system for display components for cosmetics products, the account manager system for display components for cosmetics products, the designer or developer system for display components for cosmetics products, and the finance system for display components for cosmetics products, whether to initiate services to supply one or more display components for a plurality of cosmetics products to one or more of a plurality of retail store locations;
initiate a machine to supply one or more display components for the plurality of cosmetics products to one or more of the plurality of retail store locations by initiating an electronic action via a project management component of the system for managing display components for cosmetics products to cause one or more suppliers systems to trigger an order, production and/or delivery of the one or more display components based on the determination whether to initiate services.

17. The system of claim 16, wherein the determining whether to initiate services to supply one or more display components for the plurality of cosmetics products to one or more of the plurality of retail store locations includes one or more of:
determining whether to initiate delivery of one or more display components for the plurality of cosmetics products to one or more of the plurality of retail store locations and determining whether to initiate printing, artwork or production services for producing one or more display components for the plurality of cosmetics products.

18. The system of claim 17, wherein the instructions, when executed by the at least one processor, further cause the system for managing display components for cosmetics products to:
initiate services to supply one or more display components for the plurality of cosmetics products to one or more of the plurality of retail store locations by initiating one or more of delivery of one or more display components for the plurality of cosmetics products to one or more of the plurality of retail store locations and initiating printing, artwork or production services for producing one or more display components for the plurality of cosmetics products.

19. A non-transitory computer-readable storage medium having computer-executable instructions stored thereon that, when executed, cause at least one processor to:
receive sales data of cosmetics products that were displayed by at least one retail store location of a plurality of retail store locations according to a current planogram of the at least one retail store location;
revise the current planogram of the at least one retail store location to generate a revised planogram; and
initiate a machine to supply one or more display components for the plurality of cosmetics products to the at least one retail store location for implementing revised planogram by initiating an electronic action via a project management component of a cosmetics retail displays management system to cause one or more suppliers systems to trigger an order, production and/or delivery of the one or more display components based on the revised planogram.

20. The non-transitory computer-readable storage medium of claim 19 wherein the instructions, when executed by the at least one processor, further cause the at least one processor to:
for the at least one retail store location, determine a revision to the current planogram of the at least one retail store location based on the sales data of cosmetics products that were displayed by the at least one retail store location according to the current planogram of the at least one retail store location, wherein the revising the current planogram of the at least one retail store location to generate the revised planogram is based on the determination by the at least one computer processor of the revision to the current planogram.

21. The non-transitory computer-readable storage medium of claim 20 wherein the determining the revision to the current planogram of the at least one retail store location based on the sales data includes:
determining a correlation between cosmetics products that are placed according to the current planogram and sales performance of the cosmetics products that are placed according to the current planogram; and
determining the revision to the current planogram of the at least one retail store location based on the determined correlation between the cosmetics products that are placed according to the current planogram and the sales performance of the cosmetics products that are placed according to the current planogram.

* * * * *